United States Patent
Gao et al.

(10) Patent No.: US 11,929,799 B2
(45) Date of Patent: Mar. 12, 2024

(54) COMMUNICATION METHOD AND APPARATUS

(71) Applicant: HUAWEI TECHNOLOGIES CO., LTD., Shenzhen (CN)

(72) Inventors: Xiang Gao, Beijing (CN); Kunpeng Liu, Beijing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 247 days.

(21) Appl. No.: 17/488,588

(22) Filed: Sep. 29, 2021

(65) Prior Publication Data
US 2022/0038145 A1 Feb. 3, 2022

Related U.S. Application Data

(63) Continuation of application No. PCT/CN2020/080743, filed on Mar. 23, 2020.

(30) Foreign Application Priority Data

Mar. 29, 2019 (CN) .......................... 201910252646.1

(51) Int. Cl.
*H04B 7/02* (2018.01)
*H04B 7/0456* (2017.01)

(52) U.S. Cl.
CPC .................................. *H04B 7/0456* (2013.01)

(58) Field of Classification Search
CPC .. H04B 7/0456; H04B 7/0482; H04B 7/0486; H04B 7/063; H04B 7/0639; H04B 7/0413; H04L 5/0091; H04L 5/0053
(Continued)

(56) References Cited

U.S. PATENT DOCUMENTS

2013/0273931 A1   10/2013  Lunttila et al.
2015/0296390 A1*  10/2015  Mino Diaz ........... H04L 5/0035
                                                        455/450
(Continued)

FOREIGN PATENT DOCUMENTS

CN       102082639 A    6/2011
CN       102468925 A    5/2012
(Continued)

OTHER PUBLICATIONS

"Discussion on CSI enhancement", 3GPP TSG RAN WG1 Meeting #96bis, Huawei, HiSilicon, Xi'an, China, Apr. 8-12, 2019, R1-1903969, 19 pages.
(Continued)

*Primary Examiner* — Helene E Tayong
(74) *Attorney, Agent, or Firm* — Maier & Maier, PLLC

(57) ABSTRACT

A communication method and apparatus. The method includes: a terminal device receives a first parameter from a network device, where the first parameter is used to determine indication information of a first precoding matrix and a second parameter, and the second parameter is used to determine indication information of a second precoding matrix; and then, the terminal device sends the indication information of the second precoding matrix to the network device. The method and the apparatus may be used to determine indication information of a precoding matrix when a rank indicator value reported by the terminal device is 3 or 4.

24 Claims, 3 Drawing Sheets

(58) Field of Classification Search
USPC .......................................................... 375/267
See application file for complete search history.

(56) References Cited

U.S. PATENT DOCUMENTS

| | | |
|---|---|---|
| 2017/0012689 A1 | 1/2017 | Li et al. |
| 2017/0279515 A1* | 9/2017 | Wu ..................... H04B 7/0456 |
| 2017/0332289 A1 | 11/2017 | Dinan |
| 2018/0248594 A1 | 8/2018 | Hwang et al. |

FOREIGN PATENT DOCUMENTS

| | | | |
|---|---|---|---|
| CN | WO 2017194007 | * | 11/2017 |
| CN | 108390704 A | | 8/2018 |
| CN | 108683487 A | | 10/2018 |
| WO | 2017/069580 A1 | | 4/2017 |
| WO | 2018129733 A1 | | 7/2018 |

OTHER PUBLICATIONS

"Summary of email discussion [96-NR-08] on parameter setting for RI=3-4 extension", 3GPP TSG RAN WG1 96, Samsung, Athens, Greece, Feb. 25-Mar. 1, 2019, R1-1903822, 7 pages.

"3rd Generation Partnership Project; Technical Specification Group Radio Access Network; NR; Physical layer procedures for data(Release 15)", 3GPP TS 38.214 V15.5.0 (Mar. 2019), 103 pages.

* cited by examiner

COMMUNICATION METHOD AND APPARATUS

CROSS-REFERENCE TO RELATED APPLICATIONS

This application is a continuation of International Application No. PCT/CN2020/080743, filed on Mar. 23, 2020, which claims priority to Chinese Patent Application No. 201910252646.1, filed on Mar. 29, 2019. The disclosures of the aforementioned applications are hereby incorporated by reference in their entireties.

TECHNICAL FIELD

The embodiments relate to the communications field, and in particular, to a communication method and apparatus.

BACKGROUND

A multiple-input and multiple-output (MIMO) technology can significantly improve performance of a wireless communications system by deploying a plurality of antennas on a network device and a terminal device. For example, in a diversity scenario, the MIMO technology can effectively improve transmission reliability; and in a multiplexing scenario, the MIMO technology can greatly increase a transmission throughput.

For a wireless communications system based on frequency division duplexing (FDD), an uplink (UL) and a downlink (DL) are separated. Therefore, the terminal device needs to feed back a precoding matrix or a precoding matrix index (PMI) of the downlink to the network device, so that the network device generates a precoding matrix. Specifically, the terminal device needs to report an amplitude quantization value and a phase quantization value of a combination coefficient corresponding to each frequency domain unit. Therefore, reporting overheads are high. To reduce the reporting overheads, the network device may configure compressed codebook parameters such as a quantity of spatial-domain basis vectors that need to be reported, a quantity of frequency-domain basis vectors that need to be reported, and a quantity of space-frequency combination coefficients that need to be reported.

However, in an existing technology, only that different compressed codebook parameters are configured for different rank indicator values and/or different spatial layers when a rank indicator value is 1 or 2 is provided, and how to configure a compressed codebook parameter when the rank indicator value is 3 or 4 is not provided. According to one aspect, the configuration of the compressed codebook parameter when the rank indicator value is 3 or 4 may be completed with reference to the method for configuring the compressed codebook parameters when the rank indicator value is 1 or 2. However, because there are more spatial layers when the rank indicator value is 3 or 4, a quantity of compressed codebook parameters that need to be configured is larger, and a large quantity of new parameters need to be introduced, resulting in a complex configuration process when the rank indicator value is 3 or 4. According to another aspect, to reduce configuration complexity, a value of the compressed codebook parameter when the rank indicator value is 3 or 4 may alternatively be defined by using a fixed ratio. However, the manner for using a fixed ratio is difficult to adapt to a dynamic channel condition, and performance of the compressed codebook is affected. Therefore, how to better control the configuration complexity and better adapt to the dynamic channel condition in a process of configuring the compressed codebook parameter when the rank indicator value is 3 or 4 becomes an urgent problem to be resolved.

SUMMARY

The embodiments provide a communication method and apparatus, to complete configuration of a compressed codebook parameter when a rank indicator value is 3 or 4 on a premise of considering configuration complexity of a compressed codebook parameter and adaption to a dynamic channel condition.

To achieve the foregoing objective, the following solutions are used in embodiments:

According to a first aspect, a communication method is provided. The communication method is applied to a terminal device. The communication method includes: the terminal device receives a first parameter from a network device, where the first parameter is used to determine indication information of a first precoding matrix and a second parameter, and the second parameter is used to determine indication information of a second precoding matrix; and then, the terminal device sends the indication information of the second precoding matrix to the network device.

According to the communication method provided in this embodiment, the terminal device may determine the second parameter based on the first parameter configured by a base station; and determine, based on the second parameter, the indication information used to generate the second precoding matrix. In this way, an existing configuration procedure of the first parameter is not affected, configuration complexity of configuring the second parameter can be reduced, and configuration overheads of the second parameter are reduced, thereby improving work efficiency of a wireless communications system.

For example, the first parameter may include one or more of the following parameters: a quantity of first frequency domain units, a quantity of first spatial-domain basis vectors, a quantity or a ratio of first frequency-domain basis vectors, and a quantity or a ratio of first space-frequency combination coefficients. Correspondingly, the second parameter may include one or more of the following parameters: a quantity of second frequency domain units, a quantity of second spatial-domain basis vectors, a quantity or a ratio of second frequency-domain basis vectors, and a quantity or a ratio of second space-frequency combination coefficients.

It should be noted that a ratio of frequency-domain basis vectors may be referred to as a frequency-domain basis vector coefficient or a frequency-domain basis vector quantity parameter. The ratio of frequency-domain basis vectors is a preset ratio relationship, and is used to determine a quantity of the frequency-domain basis vectors. In an implementation, the ratio of frequency-domain basis vectors is denoted as p, and the ratio represents a relationship between a quantity M of the frequency-domain basis vectors and a quantity of frequency domain units, for example, $$M = \left\lceil p \times \frac{N_f}{f} \right\rceil.$$

For example, $N_f$ is a length of a frequency-domain basis vector, that is, a quantity of elements included in the frequency-domain basis vector. A value of $N_f$ may be the quantity of frequency domain units, or may be a preset value. f is a ratio of a granularity of a CQI subband to a granularity of a PMI subband, and may be used to represent that one CQI frequency domain subband includes f PMI subbands.

A ratio of space-frequency combination coefficients may also be referred to as a space-frequency combination coefficient quantity coefficient or a space-frequency combination coefficient quantity parameter. The ratio of space-frequency combination coefficients is a preset ratio relationship, and is used to determine a quantity of the space-frequency combination coefficients. In an implementation, the ratio of space-frequency combination coefficients is denoted as $\beta$, and the ratio represents a relationship between a quantity $K_0$ of the space-frequency combination coefficients, and a quantity of frequency-domain basis vectors and a quantity of spatial-domain basis vectors, for example, $K_0=\beta 2LM$. For example, M is the quantity of frequency-domain basis vectors, and L is the quantity of spatial-domain basis vectors.

In a possible method, that the first parameter is used to determine a second parameter may include: determining the second parameter based on a first correspondence. The first correspondence includes one or more of the following correspondences: a correspondence between a quantity of first spatial-domain basis vectors and a quantity of second spatial-domain basis vectors; a correspondence between a quantity of first frequency-domain basis vectors and a quantity of second frequency-domain basis vectors; a correspondence between a ratio of first frequency-domain basis vectors and a ratio of second frequency-domain basis vectors; a correspondence between a quantity of first frequency domain units and a ratio of first frequency-domain basis vectors, and a quantity of second frequency-domain basis vectors; a correspondence between a quantity of first space-frequency combination coefficients and a quantity of second space-frequency combination coefficients; a correspondence between a ratio of first space-frequency combination coefficients and a ratio of second space-frequency combination coefficients; a correspondence between a quantity of first spatial-domain basis vectors, a quantity of first frequency-domain basis vectors, and a ratio of first space-frequency combination coefficients, and a quantity of second space-frequency combination coefficients; a correspondence between a quantity of first spatial-domain basis vectors and a quantity of first frequency-domain basis vectors, and a quantity of second spatial-domain basis vectors and a quantity of second frequency-domain basis vectors; a correspondence between a quantity of first spatial-domain basis vectors and a ratio of first frequency-domain basis vectors, and a quantity of second spatial-domain basis vectors and a ratio of second frequency-domain basis vectors; a correspondence between a quantity of first spatial-domain basis vectors and a quantity of first space-frequency combination coefficients, and a quantity of second spatial-domain basis vectors and a quantity of second space-frequency combination coefficients; and a correspondence between a quantity of first spatial-domain basis vectors and a ratio of first space-frequency combination coefficients, and a quantity of second spatial-domain basis vectors and a ratio of second space-frequency combination coefficients.

It should be noted that, in the first correspondence, one or one group of first parameters may correspond to one or more candidate values of one or more or one or more groups of second parameters. In actual application, the first correspondence may be stored in the terminal device in a manner of presetting a configuration table or a configuration pattern. The terminal device may search, based on the first parameter, for one or more candidate values of one or more or one or more groups of second parameters corresponding to the first parameter; then, perform a measurement task such as channel status measurement in a manner of traversing all the candidate values; and determine, based on a measurement result, a second parameter that needs to be reported to the network device and indication information (such as a PMI) that corresponds to the second parameter and that is used to determine the second precoding matrix, so that the network device generates the second precoding matrix. For example, a second parameter with an optimal channel status and the indication information of the second precoding matrix may be selected from the foregoing traversing measurement results.

Further, to reduce reporting overheads of the terminal device, one first index may be set for each of candidate values of a plurality of or a plurality of groups of second parameters corresponding to one or one group of first parameters in the first correspondence. In this case, the terminal device only needs to report the first index. Further, in this case, the network device also needs to store the first correspondence locally. After receiving the first index reported by the terminal device, the network device may determine the second parameter based on the first index and the first parameter that is previously delivered to the terminal device; and then, generate the second precoding matrix based on the second parameter and the indication information that is of the second precoding matrix and that is reported by the terminal device. Therefore, optionally, the communication method may further include the following step: the terminal device sends the first index to the network device. The first index is an index value determined based on the first parameter and the first correspondence. For a same first parameter (or a same group of first parameters), one first index corresponds to one second parameter.

Similarly, to reduce resource overheads for configuring the second parameter by the network device or in a case in which the network device only needs to obtain indication information that is of the second precoding matrix and that corresponds to some of a plurality of (groups of) candidate values of the second parameter, the network device may also send, to the terminal device, first indexes corresponding to the candidate values of the second parameter. Therefore, optionally, the communication method may further include the following step: the terminal device receives the first index from the network device. The first index is used to determine the second parameter based on the first parameter and the first correspondence.

In another possible method, that the first parameter is used to determine a second parameter may include: calculating a converted value of the second parameter based on the first parameter and a preset conversion rule.

For example, the preset conversion rule may include one or more of the following formulas:

$$\overline{L} = \left\lceil \frac{2}{R} \times L \right\rceil,$$

$$\overline{M} = \left\lceil \frac{2}{R} \times M \right\rceil,$$

and $$\overline{K_0} = \left\lceil \frac{2}{R} \times K_0 \right\rceil,$$

where L is a quantity of first spatial-domain basis vectors, $\overline{L}$ is a converted value of a quantity of second spatial-domain basis vectors, M is a quantity of first frequency-domain basis vectors, $\overline{M}$ is a converted value of a quantity of second frequency-domain basis vectors, $K_0$ is a quantity of first space-frequency combination coefficients, $\overline{K_0}$ is a converted value of a quantity of second space-frequency combination coefficients, R is a candidate value of a rank indicator value corresponding to the second parameter, R is a positive integer, and R>2.

Further, optionally, that the first parameter is used to determine a second parameter may further include: directly using the converted value of the second parameter as the second parameter.

Alternatively, optionally, that the first parameter is used to determine a second parameter may further include: using a sum of an offset value of the second parameter and the converted value of the second parameter as the second parameter.

One offset value of the second parameter corresponds to one second index. The offset value is usually a relatively small value, may be positive, negative, or 0, and is used to indicate a difference between corresponding converted values, so as to implement small-amplitude fine adjustment on the second parameter near the converted value. Similar to the first correspondence, the one-to-one correspondence (which is briefly referred to as a second correspondence below) between the offset value of the second parameter and the second index may also be stored in the terminal device and the network device in a manner of pre-configuring a table or a correspondence pattern.

It can be understood that the offset value of the second parameter may be directly delivered by the network device to the terminal device. Optionally, to further reduce the configuration overheads, the network device may alternatively deliver the second index to the terminal device; and then, the terminal device automatically determines the offset value of the second parameter based on the locally stored second correspondence. Therefore, optionally, the communication method according to the first aspect may further include the following step: the terminal device receives the second index or the offset value of the second parameter from the network device. One second index corresponds to one offset value of the second parameter.

Additionally, the network device may alternatively not deliver the offset value of the second parameter and the second index. In this case, the terminal device may determine the offset value of the second parameter and a candidate value of the second index based on the locally stored second correspondence, perform a measurement task such as channel status measurement in a manner of traversing all candidate values, and determine the offset value of the second parameter and the second index that need to be reported. Therefore, optionally, the communication method according to the first aspect may further include the following step: the terminal device sends the second index or the offset value of the second parameter to the network device, where one second index corresponds to one offset value of the second parameter.

It should be noted that the first parameter corresponds to a first rank indicator value, the second parameter corresponds to a second rank indicator value, and the second rank indicator value is greater than the first rank indicator value. The terminal device determines, from the first rank indicator value and the second rank indicator value based on a channel status measurement result, an optimal rank indicator value that needs to be reported, so that the network device generates a precoding matrix best matching a current channel status. Therefore, optionally, the communication method according to the first aspect may further include the following step: the terminal device sends the second rank indicator value to the network device.

According to a second aspect, a communication method is provided. The communication method is applied to a network device. The communication method includes: The network device sends a first parameter to a terminal device, where the first parameter is used by the terminal device to determine indication information of a first precoding matrix and a second parameter, and the second parameter is used to determine indication information of a second precoding matrix; and then, the network device receives the indication information of the second precoding matrix from the terminal device.

For example, the first parameter includes one or more of the following parameters: a quantity of first frequency domain units, a quantity of first spatial-domain basis vectors, a quantity or a ratio of first frequency-domain basis vectors, and a quantity or a ratio of first space-frequency combination coefficients. Correspondingly, the second parameter includes one or more of the following parameters: a quantity of second frequency domain units, a quantity of second spatial-domain basis vectors, a quantity or a ratio of second frequency-domain basis vectors, and a quantity or a ratio of second space-frequency combination coefficients.

In a possible method, that the first parameter is used to determine a second parameter may include: determining the second parameter based on a first correspondence. The first correspondence includes one or more of the following correspondences: a correspondence between a quantity of first spatial-domain basis vectors and a quantity of second spatial-domain basis vectors; a correspondence between a quantity of first frequency-domain basis vectors and a quantity of second frequency-domain basis vectors; a correspondence between a ratio of first frequency-domain basis vectors and a ratio of second frequency-domain basis vectors; a correspondence between a quantity of first frequency domain units and a ratio of first frequency-domain basis vectors, and a quantity of second frequency-domain basis vectors; a correspondence between a quantity of first space-frequency combination coefficients and a quantity of second space-frequency combination coefficients; a correspondence between a ratio of first space-frequency combination coefficients and a ratio of second space-frequency combination coefficients; a correspondence between a quantity of first spatial-domain basis vectors, a quantity of first frequency-domain basis vectors, and a ratio of first space-frequency combination coefficients, and a quantity of second space-frequency combination coefficients; a correspondence between a quantity of first spatial-domain basis vectors and a quantity of first frequency-domain basis vectors, and a quantity of second spatial-domain basis vectors and a quantity of second frequency-domain basis vectors; a correspondence between a quantity of first spatial-domain basis vectors and a ratio of first frequency-domain basis vectors, and a quantity of second spatial-domain basis vectors and a ratio of second frequency-domain basis vectors; a correspondence between a quantity of first spatial-domain basis vectors and a quantity of first space-frequency combination coefficients, and a quantity of second spatial-domain basis vectors and a quantity of second space-frequency combination coefficients; and a correspondence between a quantity of first spatial-domain basis vectors and a ratio of first space-frequency combination coefficients, and a quantity of second spatial-domain basis vectors and a ratio of second space-frequency combination coefficients.

Optionally, the communication method according to the second aspect may further include: the network device receives a first index from the terminal device. A second index is used to determine the second parameter based on the first parameter and the first correspondence.

Optionally, the communication method according to the second aspect may further include: the network device sends a first index to the terminal device. The first index is an index value determined based on the first parameter and the first correspondence, and one first index corresponds to one second parameter.

In another possible method, that the first parameter is used to determine a second parameter may include: calculating a converted value of the second parameter based on the first parameter and a preset conversion rule.

For example, the preset conversion rule may include one or more of the following formulas:

$$\overline{L} = \left\lceil \frac{2}{R} \times L \right\rceil, \overline{M} = \left\lceil \frac{2}{R} \times M \right\rceil, \text{ and } \overline{K_0} = \left\lceil \frac{2}{R} \times K_0 \right\rceil,$$

where L is a quantity of first spatial-domain basis vectors, $\overline{L}$ is a converted value of a quantity of second spatial-domain basis vectors, M is a quantity of first frequency-domain basis vectors, $\overline{M}$ is a converted value of a quantity of second frequency-domain basis vectors, $K_0$ is a quantity of first space-frequency combination coefficients, $\overline{K_0}$ is a converted value of a quantity of second space-frequency combination coefficients, R is a candidate value of a rank indicator value corresponding to the second parameter, R is a positive integer, and R>2.

Further, optionally, that the first parameter is used to determine a second parameter may further include: using the converted value of the second parameter as the second parameter.

Optionally, that the first parameter is used to determine a second parameter may further include: using a sum of an offset value of the second parameter and the converted value of the second parameter as the second parameter.

Optionally, the communication method according to the second aspect may further include: the network device sends a second index or the offset value of the second parameter to the terminal device. One second index corresponds to one offset value of the second parameter.

Optionally, the communication method according to the second aspect may further include: the network device receives a second index or the offset value of the second parameter from the terminal device. One second index corresponds to one offset value of the second parameter.

It should be noted that the first parameter corresponds to a first rank indicator value, the second parameter corresponds to a second rank indicator value, and the second rank indicator value is greater than the first rank indicator value.

Optionally, the communication method according to the second aspect may further include: the network device receives the second rank indicator value from the terminal device.

According to a third aspect, a communications apparatus is provided, applied to a terminal device. The communications apparatus includes a receiving module and a sending module. The receiving module is configured to receive a first parameter from a network device. The first parameter is used to determine indication information of a first precoding matrix and a second parameter, and the second parameter is used to determine indication information of a second precoding matrix. The sending module is configured to send the indication information of the second precoding matrix to the network device.

For example, the first parameter includes one or more of the following parameters: a quantity of first frequency domain units, a quantity of first spatial-domain basis vectors, a quantity or a ratio of first frequency-domain basis vectors, and a quantity or a ratio of first space-frequency combination coefficients. Correspondingly, the second parameter includes one or more of the following parameters: a quantity of second frequency domain units, a quantity of second spatial-domain basis vectors, a quantity or a ratio of second frequency-domain basis vectors, and a quantity or a ratio of second space-frequency combination coefficients.

In a possible implementation, that the first parameter is used to determine a second parameter may include: determining the second parameter based on a first correspondence. The first correspondence includes one or more of the following correspondences: a correspondence between a quantity of first spatial-domain basis vectors and a quantity of second spatial-domain basis vectors; a correspondence between a quantity of first frequency-domain basis vectors and a quantity of second frequency-domain basis vectors; a correspondence between a ratio of first frequency-domain basis vectors and a ratio of second frequency-domain basis vectors; a correspondence between a quantity of first frequency domain units and a ratio of first frequency-domain basis vectors, and a quantity of second frequency-domain basis vectors; a correspondence between a quantity of first space-frequency combination coefficients and a quantity of second space-frequency combination coefficients; a correspondence between a ratio of first space-frequency combination coefficients and a ratio of second space-frequency combination coefficients; a correspondence between a quantity of first spatial-domain basis vectors, a quantity of first frequency-domain basis vectors, and a ratio of first space-frequency combination coefficients, and a quantity of second space-frequency combination coefficients; a correspondence between a quantity of first spatial-domain basis vectors and a quantity of first frequency-domain basis vectors, and a quantity of second spatial-domain basis vectors and a quantity of second frequency-domain basis vectors; a correspondence between a quantity of first spatial-domain basis vectors and a ratio of first frequency-domain basis vectors, and a quantity of second spatial-domain basis vectors and a ratio of second frequency-domain basis vectors; a correspondence between a quantity of first spatial-domain basis vectors and a quantity of first space-frequency combination coefficients, and a quantity of second spatial-domain basis vectors and a quantity of second space-frequency combination coefficients; and a correspondence between a quantity of first spatial-domain basis vectors and a ratio of first space-frequency combination coefficients, and a quantity of second spatial-domain basis vectors and a ratio of second space-frequency combination coefficients.

Optionally, the sending module is further configured to send a first index to the network device. The first index is an index value determined based on the first parameter and the first correspondence, and one first index corresponds to one second parameter.

Optionally, the receiving module is further configured to receive a first index from the network device. The first index is used to determine the second parameter based on the first parameter and the first correspondence.

In another possible implementation, that the first parameter is used to determine a second parameter may include:

calculating a converted value of the second parameter based on the first parameter and a preset conversion rule.

For example, the preset conversion rule includes one or more of the following formulas:

$$L = \left\lceil \frac{2}{R} \times L \right\rceil, \overline{M} = \left\lceil \frac{2}{R} \times M \right\rceil, \text{ and } \overline{K_0} = \left\lceil \frac{2}{R} \times K_0 \right\rceil,$$

where L is a quantity of first spatial-domain basis vectors, $\overline{L}$ is a converted value of a quantity of second spatial-domain basis vectors, M is a quantity of first frequency-domain basis vectors, $\overline{M}$ is a converted value of a quantity of second frequency-domain basis vectors, $K_0$ is a quantity of first space-frequency combination coefficients, $\overline{K_0}$ is a converted value of a quantity of second space-frequency combination coefficients, R is a candidate value of a rank indicator value corresponding to the second parameter, and R>2.

Further, optionally, that the first parameter is used to determine a second parameter may further include: using the converted value of the second parameter as the second parameter.

Further, optionally, that the first parameter is used to determine a second parameter may further include: using a sum of an offset value of the second parameter and the converted value of the second parameter as the second parameter.

Alternatively, optionally, that the first parameter is used to determine a second parameter may further include: the sending module is further configured to send a second index or the offset value of the second parameter to the network device. One second index corresponds to one offset value of the second parameter.

Optionally, the receiving module is further configured to receive a second index or the offset value of the second parameter from the network device, where one second index corresponds to one offset value of the second parameter.

It should be noted that the first parameter corresponds to a first rank indicator value, the second parameter corresponds to a second rank indicator value, and the second rank indicator value is greater than the first rank indicator value.

Optionally, the sending module is further configured to send the second rank indicator value to the network device.

It should be noted that the communications apparatus may be a terminal device, or may be a chip or chip system disposed in the terminal device. This is not limited in the embodiments.

According to a fourth aspect, a communications apparatus is provided, applied to a network device. The communications apparatus includes a sending module and a receiving module. The sending module is configured to send a first parameter to a terminal device. The first parameter is used by the terminal device to determine indication information of a first precoding matrix and a second parameter, and the second parameter is used to determine indication information of a second precoding matrix. The receiving module is configured to receive the indication information of the second precoding matrix from the terminal device.

For example, the first parameter includes one or more of the following parameters: a quantity of first frequency domain units, a quantity of first spatial-domain basis vectors, a quantity or a ratio of first frequency-domain basis vectors, and a quantity or a ratio of first space-frequency combination coefficients. Correspondingly, the second parameter includes one or more of the following parameters: a quantity of second frequency domain units, a quantity of second spatial-domain basis vectors, a quantity or a ratio of second frequency-domain basis vectors, and a quantity or a ratio of second space-frequency combination coefficients.

In a possible implementation, that the first parameter is used to determine a second parameter may include: determining the second parameter based on a first correspondence. The first correspondence includes one or more of the following correspondences: a correspondence between a quantity of first spatial-domain basis vectors and a quantity of second spatial-domain basis vectors; a correspondence between a quantity of first frequency-domain basis vectors and a quantity of second frequency-domain basis vectors; a correspondence between a ratio of first frequency-domain basis vectors and a ratio of second frequency-domain basis vectors; a correspondence between a quantity of first frequency domain units and a ratio of first frequency-domain basis vectors, and a quantity of second frequency-domain basis vectors; a correspondence between a quantity of first space-frequency combination coefficients and a quantity of second space-frequency combination coefficients; a correspondence between a ratio of first space-frequency combination coefficients and a ratio of second space-frequency combination coefficients; a correspondence between a quantity of first spatial-domain basis vectors, a quantity of first frequency-domain basis vectors, and a ratio of first space-frequency combination coefficients, and a quantity of second space-frequency combination coefficients; a correspondence between a quantity of first spatial-domain basis vectors and a quantity of first frequency-domain basis vectors, and a quantity of second spatial-domain basis vectors and a quantity of second frequency-domain basis vectors; a correspondence between a quantity of first spatial-domain basis vectors and a ratio of first frequency-domain basis vectors, and a quantity of second spatial-domain basis vectors and a ratio of second frequency-domain basis vectors; a correspondence between a quantity of first spatial-domain basis vectors and a quantity of first space-frequency combination coefficients, and a quantity of second spatial-domain basis vectors and a quantity of second space-frequency combination coefficients; and a correspondence between a quantity of first spatial-domain basis vectors and a ratio of first space-frequency combination coefficients, and a quantity of second spatial-domain basis vectors and a ratio of second space-frequency combination coefficients.

Optionally, the receiving module is further configured to receive a first index from the terminal device, where the second index is used to determine the second parameter based on the first parameter and the first correspondence.

Optionally, the sending module is further configured to send a first index to the terminal device, where the first index is an index value determined based on the first parameter and the first correspondence, and one first index corresponds to one second parameter.

In another possible implementation, that the first parameter is used to determine a second parameter may include: calculating a converted value of the second parameter based on the first parameter and a preset conversion rule.

For example, the preset conversion rule may include one or more of the following formulas:

$$L = \left\lceil \frac{2}{R} \times L \right\rceil, \overline{M} = \left\lceil \frac{2}{R} \times M \right\rceil, \text{ and } \overline{K_0} = \left\lceil \frac{2}{R} \times K_0 \right\rceil,$$

where L is a quantity of first spatial-domain basis vectors, $\overline{L}$ is a converted value of a quantity of second spatial-domain basis vectors, M is a quantity of first frequency-domain basis vectors, $\overline{M}$ is a converted value of a quantity of second frequency-domain basis vectors, $K_0$ is a quantity of first space-frequency combination coefficients, $\overline{K_0}$ is a converted value of a quantity of second space-frequency combination coefficients, R is a candidate value of a rank indicator value corresponding to the second parameter, and R>2.

Further, optionally, that the first parameter is used to determine a second parameter may further include: using the converted value of the second parameter as the second parameter.

Optionally, that the first parameter is used to determine a second parameter may further include: using a sum of an offset value of the second parameter and the converted value of the second parameter as the second parameter.

Optionally, the sending module is further configured to send a second index or the offset value of the second parameter to the terminal device, where one second index corresponds to one offset value of the second parameter.

Optionally, the receiving module is further configured to receive a second index or the offset value of the second parameter from the terminal device, where one second index corresponds to one offset value of the second parameter.

It should be noted that the first parameter corresponds to a first rank indicator value, the second parameter corresponds to a second rank indicator value, and the second rank indicator value is greater than the first rank indicator value.

Optionally, the receiving module is further configured to receive the second rank indicator value from the terminal device.

It should be noted that the communications apparatus may be a network device, or may be a chip or chip system disposed in the network device. This is not limited in the embodiments.

According to a fifth aspect, a terminal device is provided, including a processor. The processor is coupled to a memory. The memory is configured to store a computer program. The processor is configured to execute the computer program stored in the memory, so that the terminal device performs the communication method according to any one of the first aspect or the possible implementations of the first aspect, or the communication method according to any one of the second aspect or the possible implementations of the second aspect.

According to a sixth aspect, a network device is provided, including a processor. The processor is coupled to a memory. The memory is configured to store a computer program. The processor is configured to execute the computer program stored in the memory, so that the network device performs the communication method according to any one of the first aspect or the possible implementations of the first aspect, or the communication method according to any one of the second aspect or the possible implementations of the second aspect.

According to a seventh aspect, a communications system is provided. The communications system includes one or more of the foregoing terminal devices and one or more of the foregoing network devices.

According to an eighth aspect, a computer program product is provided. The computer program product includes computer program code. When the computer program code is run on a computer, the computer performs the communication method according to any one of the first aspect or the possible implementations of the first aspect, and/or the communication method according to any one of the second aspect or the possible implementations of the second aspect.

According to a ninth aspect, a readable storage medium is provided, including a program or instructions. When the program or the instructions are run on a computer, the computer performs the communication method according to any one of the first aspect or the possible implementations of the first aspect, and/or the communication method according to any one of the second aspect or the possible implementations of the second aspect.

DETAILED DESCRIPTION OF THE EMBODIMENTS

Figure 1:
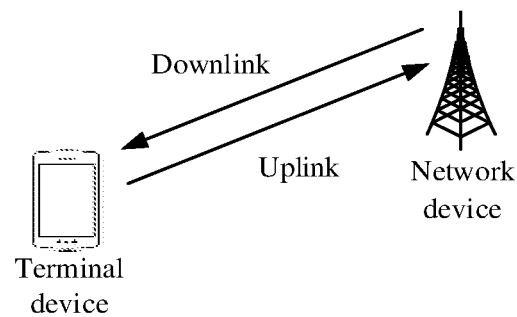
FIG. 1 is a schematic architectural diagram of a communications system according to an embodiment.

For ease of understanding embodiments, terms used in the embodiments are first briefly described.

1. Precoding technology: When a channel status is known, a sending device (for example, a network device) may process a to-be-sent signal by using a precoding matrix matching a channel resource, so that a precoded to-be-sent signal is adapted to a channel, and complexity of eliminating influence between channels by a receiving device (for example, a terminal device) is reduced. Therefore, by precoding the to-be-sent signal, quality (for example, a signal to interference plus noise ratio (SINR)) of a received signal is improved. Therefore, using the precoding technology can help improve performance of transmission performed by a sending device and a plurality of receiving devices on a same time-frequency resource, that is, improve performance of a multiple-user multiple-input multiple-output (MU-MIMO) system.

It should be understood that the related description of the precoding technology is merely an example for ease of understanding and is not intended to limit the scope of the embodiments. In a specific implementation process, the sending device may further perform precoding in another manner. For example, when channel information (for example, but not limited to, a channel matrix) cannot be obtained, precoding is performed by using a preset precoding matrix or in a weighting processing manner. For brevity, specific content thereof is not described in the embodiments.

2. Precoding matrix and precoding matrix indicator (PMI): The PMI may be used to indicate the precoding matrix. The precoding matrix may be, for example, a precoding matrix that is determined by a terminal device based on a channel matrix of each frequency domain unit (for example, a frequency domain subband; R times of a frequency domain subband, where R=1 or ½; or a quantity of RBs) and that corresponds to each frequency domain unit.

The channel matrix may be determined by the terminal device in a manner such as channel estimation or based on channel reciprocity. However, it should be understood that a specific method for determining the channel matrix by the terminal device is not limited to the foregoing description. For a specific implementation, refer to the existing technology. For brevity, details are not listed herein.

The precoding matrix may be obtained by performing singular value decomposition (SVD) on the channel matrix or a covariance matrix of the channel matrix, or may be obtained by performing eigenvalue decomposition (EVD) on a covariance matrix of the channel matrix.

It should be understood that the foregoing enumerated manners of determining the precoding matrix are merely examples, and should not constitute any limitation on this application. For a manner of determining the precoding matrix, refer to the existing technology. For brevity, details are not listed herein.

It should be noted that, in the embodiments, a precoding matrix corresponding to a frequency domain unit may be a precoding matrix fed back for the frequency domain unit, for example, may be a precoding matrix on which channel sounding and a feedback are performed based on a reference signal on the frequency domain unit. The precoding matrix corresponding to the frequency domain unit may be used as a precoding matrix used to precode data transmitted by the frequency domain unit. In the following, a precoding matrix corresponding to a frequency domain unit may also be referred to as a precoding matrix of the frequency domain unit for short, and a precoding vector corresponding to a frequency domain unit may also be referred to as a precoding vector of the frequency domain unit.

It should be further noted that, in the embodiments, a precoding matrix determined by the network device based on a feedback of the terminal device may be directly used for downlink data transmission; or a final precoding matrix used for downlink data transmission may be obtained by using some beamforming methods such as zero forcing (ZF), regularized zero forcing (RZF), a minimum mean-squared error (MMSE), and a maximum signal-to-leakage-and-noise ratio (SLNR). This is not limited in the embodiments. Unless otherwise specifically described, the precoding matrix (or vector) in the following may be a precoding matrix (or vector) determined by the network device based on a feedback of the terminal device.

3. Precoding vector: One precoding matrix may include one or more vectors, for example, one or more column vectors. One precoding matrix may be used to determine one or more precoding vectors.

When a quantity of transmission layers (a rank, also referred to as a rank indicator value, a quantity of data flows, a quantity of space layers, or the like) is 1 and a quantity of polarization directions of a transmit antenna is also 1, the precoding vector may be a precoding matrix. When a quantity of transmission layers is multiple and a quantity of polarization directions of transmit antennas is 1, the precoding vector may be a component of a precoding matrix at one transmission layer. When a quantity of transmission layers is 1 and a quantity of polarization directions of transmit antennas is multiple, the precoding vector may be a component of a precoding matrix in one polarization direction. When a quantity of transmission layers is multiple and a quantity of polarization directions of transmit antennas is also multiple, the precoding vector may be a component of a precoding matrix at one transmission layer and in one polarization direction.

It should be understood that the precoding vector may alternatively be determined by a vector in a precoding matrix, for example, obtained after mathematical transformation is performed on the vector in the precoding matrix. A mathematical transformation relationship between the precoding matrix and the precoding vector is not limited in the embodiments.

4. Antenna port: The antenna port is briefly referred to as a port, and may be understood as a virtual antenna that is identified by a receiving device or a transmit antenna that can be identified in space. One antenna port may be configured for each virtual antenna, each virtual antenna may be a weighted combination of a plurality of physical antennas, and each antenna port may correspond to one reference signal. Therefore, each antenna port may be referred to as a port of one reference signal. In the embodiments, the antenna port may be an actual independent transceiver unit (transceiver unit, TxRU).

5. Spatial-domain basis vector (spatial domain vector): The spatial-domain basis vector is also referred to as a spatial-domain beam basis vector, a spatial domain beam vector, or a spatial domain vector. Each element in the spatial-domain basis vector may represent a weight of each antenna port. Based on weights of all antenna ports represented by all elements in the spatial-domain basis vector, signals of all the antenna ports are linearly superimposed to form a region with stronger signals in a direction in space.

For ease of description, the spatial-domain basis vector is denoted as u in the following. A length of the spatial-domain basis vector u may be a quantity of $N_s$ of transmit antenna ports in one polarization direction, where $N_s \geq 1$ and is an integer. The spatial-domain basis vector may be, for example, a column vector or a row vector whose length is $N_s$. This is not limited in the embodiment.

For a definition of the spatial-domain basis vector, refer to a two-dimensional (2 dimensions, 2D)-discrete fourier transform (DFT) vector or an over-sampling 2D-DFT vector $v_{l,m}$ defined in a type II codebook in the NR protocol TS 38.214 release 15 (release 15, R15). For brevity, details are not described herein.

6. Spatial-domain basis vector set: The spatial-domain basis vector set is also referred to as a spatial domain vector set. A vector set formed by candidate spatial-domain basis vectors may include a plurality of spatial-domain basis vectors with different lengths, so as to correspond to different quantities of transmit antenna ports. In the embodiments, because a length of the spatial-domain basis vector is $N_s$, a length of each spatial-domain basis vector in a spatial-domain basis vector set to which a spatial-domain basis vector reported by the terminal device belongs is $N_s$.

In a possible implementation, the spatial-domain basis vector set may include $N_s$ spatial-domain basis vectors, and every two of the $N_s$ spatial-domain basis vectors may be orthogonal to each other. Each spatial-domain basis vector in the spatial-domain basis vector set may be selected from a 2D-DFT matrix, where 2D may represent two different directions, for example, a horizontal direction and a vertical direction. If a quantity of antenna ports in the horizontal direction and a quantity of antenna ports in the vertical direction are respectively $N_1$ and $N_2$, $N_s = N_1 N_2$.

The $N_s$ spatial-domain basis vectors may be denoted as, for example, $u_1 u_2, \ldots,$ and $u_{N_s}$. The $N_s$ spatial-domain basis vectors may construct a matrix $B_s$, where $B_s = [u_1 u_2 \ldots u_{N_s}]$. If each spatial-domain basis vector in the spatial-domain basis vector set is selected from the 2D-DFT matrix, $B_s = D_{N_1} \otimes D_{N_2}$, where $D_N$ is an N×N orthogonal DFT matrix, and an element in a row m and column n is $$[D_N]_{m,n} = \frac{1}{\sqrt{N}} e^{\frac{j2\pi mn}{N}}.$$

In another possible implementation, the spatial-domain basis vector set may be extended into $O_s \times N_s$ spatial-domain basis vectors by using an over-sampling factor $O_s$. In this case, the spatial-domain basis vector set may include $O_s$ subsets, and each subset may include $N_s$ spatial-domain basis vectors. Every two of the $N_s$ spatial-domain basis vectors in each subset may be orthogonal to each other. Each spatial-domain basis vector in the spatial-domain basis vector set may be selected from an over-sampling 2D-DFT matrix. The over-sampling factor $O_s$ is a positive integer. For example, $O_s = O_1 \times O_2$, where $O_1$ may be an over-sampling factor in a horizontal direction, $O_2$ may be an over-sampling factor in a vertical direction, $O_1 \geq 1$, $O_2 \geq 1$, and $O_1$ and $O_2$ are not 1 at the same time and are integers.

$N_s$ spatial-domain basis vectors in an $o_s^{th}$ (where $1 \leq o_s \leq O_s$, and $o_s$ is an integer) subset in the spatial-domain basis vector set may be denoted as, for example, $u_1^{o_s}$, $u_2^{o_s}$, ..., and $u_{N_s}^{o_s}$. A matrix $B_s^{o_s}$ and may be constructed based on the $N_s$ spatial-domain basis vectors in the $o_s^{th}$ subset, where $B_s^{o_s} = [u_1^{o_s} \, u_2^{o_s} \, \ldots \, u_{N_s}^{o_s}]$.

Therefore, each spatial-domain basis vector in the spatial-domain basis vector set may be selected from a 2D-DFT matrix or an over-sampling 2D-DFT matrix. Each column vector in the spatial-domain basis vector set may be referred to as one 2D-DFT vector or one over-sampling 2D-DFT vector. In other words, the spatial-domain basis vector may be a 2D-DFT vector or an over-sampling 2D-DFT vector.

7. Frequency-domain basis vector (frequency domain vector): The frequency-domain basis vector is also referred to as a frequency domain vector, and is a vector that is provided in the embodiments and that is used to represent a change rule of a channel in frequency domain. Each frequency-domain basis vector may represent one change rule. When a signal is transmitted over a radio channel, the signal may arrive at a receive antenna from a transmit antenna through a plurality of paths. Frequency selective fading caused by multipath delay is a change in a frequency domain channel. Therefore, change rules, caused by delay on different transmission paths, of channels in frequency domain may be represented by using different frequency-domain basis vectors.

For ease of description, the frequency-domain basis vector is denoted as v in the following. A length of the frequency-domain basis vector may be a quantity of frequency domain units, or may be a quantity of frequency domain units (for example, a quantity of reporting bands) with channel status indicators (CSI) to be reported. In addition, the length of the frequency-domain basis vector may alternatively be a preset value, for example, an integer that is a multiple of 2, 3, or 5. The length of the frequency-domain basis vector is denoted as $N_f$, where $N_f \geq 1$ and is an integer.

8. Frequency-domain basis vector set: The frequency-domain basis vector set is a vector set including a plurality of candidate frequency-domain basis vectors, and may include frequency-domain basis vectors of a plurality of different lengths. One or more frequency-domain basis vectors in the frequency-domain basis vector set are selected to construct a precoding vector.

In a possible implementation, the frequency-domain basis vector set may include a plurality of frequency-domain basis vectors. Every two of the plurality of frequency-domain basis vectors are orthogonal to each other. Each frequency-domain basis vector in the frequency-domain basis vector set may be selected from a DFT matrix or an IDFT matrix (that is, a conjugate transpose matrix of a DFT matrix).

For example, the $N_f$ frequency-domain basis vectors may be denoted as $v_1, v_2, \ldots,$ and $v_{N_f}$. The $N_f$ frequency-domain basis vectors may construct a matrix $B_f$, where $B_f = [v_1 \, v_2 \, \ldots \, v_{N_f}]$.

In another possible implementation, the frequency-domain basis vector set may be extended into $O_f \times N_f$ frequency-domain basis vectors by using an over-sampling factor Or. In this case, the frequency-domain basis vector set may include $O_f$ subsets, and each subset may include $N_f$ frequency-domain basis vectors. Every two of the $N_f$ frequency-domain basis vectors in each subset may be orthogonal to each other. Each subset may be referred to as an orthogonal group. Each frequency-domain basis vector in the frequency-domain basis vector set may be selected from an over-sampling DFT matrix or a conjugate transpose matrix of an over-sampling DFT matrix. The over-sampling factor $O_f$ is a positive integer.

For example, $N_f$ frequency-domain basis vectors in an $o_f^{th}$ (where $1 \leq o_f \leq O_f$ and $o_f$ is an integer) subset in the frequency-domain basis vector set may be denoted as $v_1^{o_f}, v_2^{o_f}, \ldots,$ and $v_{N_f}^{o_f}$. A matrix $B_f^{o_f}$ may be constructed based on the $N_f$ frequency-domain basis vectors in the $o_f^{th}$ subset, where $B_f^{o_f} = [v_1^{o_f} \, v_2^{o_f} \, \ldots \, v_{N_f}^{o_f}]$.

Therefore, each frequency-domain basis vector in the frequency-domain basis vector set may be selected from a DFT matrix or an over-sampling DFT matrix, or selected from a conjugate transpose matrix of a DFT matrix or a conjugate transpose matrix of an over-sampling DFT matrix. Each column vector in the frequency-domain basis vector set may be referred to as one DFT vector or one over-sampling DFT vector. In other words, the frequency-domain basis vector may be a DFT vector or an over-sampling DFT vector.

9. Space-frequency component matrix: A space-frequency component matrix may be determined by a spatial-domain basis vector and a frequency-domain basis vector. A space-frequency component matrix may be determined by, for example, a spatial-domain basis vector and a conjugate transpose of a frequency-domain basis vector. For example, $u \times v^H$, and a dimension thereof may be $N_s \times N_f$.

It should be understood that the space-frequency component matrix may be a representation form of a space-frequency basic unit determined by a spatial-domain basis vector and a frequency-domain basis vector. The space-frequency basic unit may alternatively be represented, for example, as a space-frequency component vector. The space-frequency component vector may be determined, for example, by a Kronecker product of a spatial-domain basis vector and a frequency-domain basis vector. The space-frequency basic unit may alternatively be represented, for example, as a space-frequency vector pair. A specific representation form of the space-frequency basic unit is not limited in the embodiment. Based on a same idea, various possible forms determined by a person skilled in the art by using a spatial-domain basis vector and a frequency-domain basis vector fall within the scope of the embodiments. In addition, if a form different from those listed above is defined for the spatial-domain basis vector or the frequency-domain basis vector, an operation relationship between the space-frequency component matrix, and the spatial-domain basis vector and the frequency-domain basis vector may also be different. The operation relationship between the space-frequency component matrix, and the spatial-domain basis vector and the frequency-domain basis vector is not limited in the embodiment.

10. Space-frequency matrix: In the embodiments, the space-frequency matrix may be understood as an intermediate quantity used to determine a precoding matrix. For a terminal device, the space-frequency matrix may be determined by a precoding matrix or a channel matrix. For a network device, the space-frequency matrix may be obtained by using a weighted sum of a plurality of space-frequency component matrices, so as to recover a downlink channel or a precoding matrix.

As described above, the space-frequency component matrix may be represented as a matrix with a dimension of $N_s \times N_f$, and the space-frequency matrix may also be represented as a matrix with a dimension of $N_s \times N_f$. The space-frequency matrix with a dimension of $N_s \times N_f$ may include $N_f$ column vectors, each of which has a length of $N_s$. The $N_f$ column vectors may correspond to $N_f$ frequency domain units, and each column vector may be used to determine a precoding vector of a corresponding frequency domain unit.

For example, the space-frequency matrix may be denoted as V, where $V=[V_1\ V_2\ \ldots\ V_{N_f}]$. $V_1$ to $V_{N_f}$ are $N_f$ column vectors corresponding to the $N_f$ frequency domain units. For a single-polarized antenna, a length of each column vector may be $N_s$. The $N_f$ column vectors respectively correspond to target precoding vectors of the $N_f$ frequency domain units. That is, the space-frequency matrix V may be considered as a joint matrix constructed by combining the target precoding vectors corresponding to the $N_f$ frequency domain units.

It should be understood that the space-frequency matrix is merely a representation form used to determine an intermediate quantity of the precoding matrix, and should not constitute any limitation on this application. For example, column vectors in the space-frequency matrix are sequentially connected to each other in a head-to-tail manner from left to right, or arranged according to another predefined rule. In this way, a vector having a length of $N_s \times N_f$ can also be obtained, and the vector may be referred to as a space-frequency vector.

It should be further understood that the dimensions of the space-frequency matrix and the space-frequency vector shown above are merely examples, and should not constitute any limitation on this application. For example, the space-frequency matrix may alternatively be a matrix with a dimension of $N_f \times N_s$. Each row vector may correspond to one frequency domain unit, to determine a precoding vector of the corresponding frequency domain unit.

In addition, when a transmit antenna is configured with a plurality of polarization directions, the dimension of the space-frequency matrix may further be extended. For example, for a dual-polarized antenna, the dimension of the space-frequency matrix may be $2N_s \times N_f$ or $N_f \times 2N_s$, where $V_1$ to $V_{N_f}$ are $N_f$ column vectors corresponding to $N_f$ frequency domain units, and each column vector has a length of $2N_s$. It should be understood that a quantity of polarization directions of a transmit antenna is not limited in the embodiment.

11. Dual-domain compression: The dual-domain compression includes spatial domain compression and frequency domain compression. The spatial domain compression may mean that one or more spatial-domain basis vectors are selected from a spatial-domain basis vector set as one or more spatial-domain basis vectors for constructing a precoding vector. The frequency domain compression may mean that one or more frequency-domain basis vectors are selected from a frequency-domain basis vector set as one or more frequency-domain basis vectors for constructing a precoding vector. The selected spatial-domain basis vectors are some or all spatial-domain basis vectors in the spatial-domain basis vector set. The selected frequency-domain basis vectors are some or all frequency-domain basis vectors in the frequency-domain basis vector set.

The one or more selected spatial-domain basis vectors may construct a spatial domain beam basis matrix $W_1$, and each column vector in $W_1$ corresponds to one selected spatial-domain basis vector. The one or more selected frequency-domain basis vectors may construct a frequency domain basis matrix $W_3$, and each column vector in $W_3$ corresponds to one selected frequency-domain basis vector. For a transmission layer, the space-frequency matrix V may be represented as a result of a linear combination of the one or more selected spatial-domain basis vectors and the one or more selected frequency-domain basis vectors:

$$V = W_1 \tilde{W} W_3^H.$$

If two polarization directions are used, L spatial-domain basis vectors are selected for each polarization direction of each transmission layer. A dimension of $W_1$ is $2N_s \times 2L$. In a possible implementation, L same spatial-domain basis vectors $\{v_{Is(0)}, v_{Is(1)}, \ldots, v_{Is(L-1)}\}$ are used in the two polarization directions. In this case, $W_1$ may be represented as:

$$W_1 = \begin{bmatrix} v_{Is(0)} & v_{Is(1)} & \cdots & v_{Is(L-1)} & 0 & 0 & \cdots & 0 \\ 0 & 0 & \cdots & 0 & v_{Is(0)} & v_{Is(1)} & \cdots & v_{Is(L-1)} \end{bmatrix}.$$

$v_{Is(i)}$ represents an index corresponding to a selected spatial-domain basis vector, and $i=0, 1, \ldots, L-1$. In addition, L spatial-domain basis vectors that are not completely the same may alternatively be used in the two polarization directions.

For example, if M same frequency-domain basis vectors are selected for each spatial-domain basis vector, a dimension of $W_3^H$ is $M \times N_f$, and each column vector in $W_3$ corresponds to one frequency-domain basis vector. In this case, frequency-domain basis vectors corresponding to each spatial-domain basis vector are M frequency-domain basis vectors in $W_3$. $\tilde{W}$ is a space-frequency combination coefficient matrix, which has a dimension of $2L \times M$. An $i^{th}$ row in the space-frequency combination coefficient matrix $\tilde{W}$ corresponds to an $i^{th}$ spatial-domain basis vector in 2L spatial-domain basis vectors. A $j^{th}$ column in the space-frequency combination coefficient matrix $\tilde{W}$ corresponds to a $j^{th}$ frequency-domain basis vector in M frequency-domain basis vectors. A space-frequency combination coefficient corresponding to the $i^{th}$ spatial-domain basis vector is an $i^{th}$ row vector in the space-frequency combination coefficient matrix $\tilde{W}$. The space-frequency combination coefficient corresponding to the $i^{th}$ spatial-domain basis vector is an element included in the $i^{th}$ row vector in the space-frequency combination coefficient matrix $\tilde{W}$.

In addition, each of the L spatial-domain basis vectors may alternatively correspond to a different frequency-domain basis vector. In this case, $W_3^H=[W_f(0), W_f(1), \ldots, W_f(2L-1)]$, where $W_f(i)$ is a matrix that has $M_i$ rows and $N_f$ columns and that is constructed by $M_i$ frequency-domain basis vectors corresponding to the $i^{th}$ spatial-domain basis vector:

$$\tilde{W} = \begin{bmatrix} \tilde{\tilde{W}}^{(0)} & 0 & 0 \\ 0 & \ldots & 0 \\ 0 & 0 & \tilde{\tilde{W}}^{(2L-1)} \end{bmatrix}.$$

$\tilde{\tilde{W}}^{(i)}$ is a space-frequency combination coefficient matrix that has a dimension of $1 \times M_i$ and that corresponds to the $i^{th}$ spatial-domain basis vector. A space-frequency combination coefficient included in IV is a space-frequency combination coefficient corresponding to the $i^{th}$ spatial-domain basis vector. In this case, $[\tilde{\tilde{W}}^{(0)}, \tilde{\tilde{W}}^{(1)}, \ldots, \tilde{\tilde{W}}^{(2L-1)}]$ includes a total of $$\sum_{i=0}^{2L-1} M_i$$

combination coefficients. If a quantity of frequency-domain basis vectors corresponding to each spatial-domain basis vector is M, $[\tilde{\tilde{W}}^{(0)}, \tilde{\tilde{W}}^{(1)}, \ldots, \tilde{\tilde{W}}^{(2L-1)}]$ includes a total of 2LM combination coefficients.

In addition, the space-frequency matrix V may alternatively be represented as $V = W_1 W W_3^H$. In this case, each row vector in $W_3$ corresponds to one selected frequency-domain basis vector.

It should be noted that each polarization direction of one transmission layer corresponds to L spatial-domain basis vectors, and two polarization directions of the transmission layer correspond to a total of 2L spatial-domain basis vectors. In the embodiments, an example in which L spatial-domain basis vectors corresponding to each of two polarization directions of one transmission layer are completely the same is used for description.

It should be further noted that, in the embodiments, 2L spatial-domain basis vectors corresponding to two polarization directions of one transmission layer are referred to as spatial-domain basis vector corresponding to the transmission layer. It is assumed that M frequency-domain basis vectors are selected for each of the 2L spatial-domain basis vectors. If the M frequency-domain basis vectors selected for each spatial-domain basis vector are not completely the same, 2L×M frequency-domain basis vectors corresponding to the 2L spatial-domain basis vectors are referred to as frequency-domain basis vectors corresponding to the transmission layer. If the M frequency-domain basis vectors selected for each spatial-domain basis vector are completely the same, M frequency-domain basis vectors corresponding to the 2L spatial-domain basis vectors are referred to as frequency-domain basis vectors corresponding to the transmission layer. 2L×M space-frequency combination coefficients corresponding to the 2L spatial-domain basis vectors are referred to as space-frequency combination coefficients corresponding to the transmission layer.

It should be further noted that, in an implementation, only all subsets that are of combination coefficients and that are included in the combination coefficient matrix $\tilde{W}$ need to be reported. A base station indicates, by using indication information, a maximum quantity $K_0$ of combination coefficients that need to be reported, UE actually reports $K_1$ combination coefficients, and $K_1 \leq K_0 \leq 2LM$. For an unreported combination coefficient, it is considered that a corresponding space-frequency combination coefficient is 0.

It should be further noted that, for one transmission layer, a space-frequency matrix may be determined through dual-domain compression according to the foregoing method. For a plurality of transmission layers, a same dual-domain compression method may be used for each transmission layer to determine a space-frequency matrix corresponding to each transmission layer. Two transmission layers are used as an example. A same quantity of spatial-domain basis vectors or different quantities of spatial-domain basis vectors may be used for the two transmission layers. A same quantity of frequency-domain basis vectors or different quantities of frequency-domain basis vectors may be used for the two transmission layers. L spatial-domain basis vectors that are the same or that are not completely the same may be used for the two transmission layers. M same frequency-domain basis vectors may be used for the two transmission layers, or each spatial-domain basis vector of each transmission layer may correspond to a different frequency-domain basis vector.

It should be further noted that, for a transmission layer, the quantity L of spatial-domain basis vectors, the quantity M of frequency-domain basis vectors, and a maximum quantity $K_0$ of space-frequency combination coefficients that need to be reported may be configured by a network device by using higher layer signaling. The network device may directly configure, by using the higher layer signaling, specific values of the quantity L of spatial-domain basis vectors, the quantity M of frequency-domain basis vectors, and the maximum quantity $K_0$ of space-frequency combination coefficients that need to be reported; or may configure, by using the higher layer signaling, indexes corresponding to specific values. In addition, a quantity of frequency domain combination coefficients may be proportional to a quantity of frequency domain units, for example, $$M = \left\lceil p \times \frac{N_f}{f} \right\rceil,$$

where p<1, and a value of p may be ¾, ½, ¼, or ⅛. Furthermore, the maximum quantity $K_0$ of space-frequency combination coefficients that need to be reported may be β times of 2LM, where β<1, and a value of β may be ¾, ½, ¼, or ⅛.

In addition, a matrix determined by a spatial-domain basis vector and a frequency-domain basis vector may be, for example, the foregoing space-frequency component matrix. One or more selected spatial-domain basis vectors and one or more selected frequency-domain basis vectors may be used to determine one or more space-frequency component matrices. A weighted sum of the one or more space-frequency component matrices may be used to construct a space-frequency matrix corresponding to one transmission layer. In other words, the space-frequency matrix may approximately be the weighted sum of the one or more space-frequency component matrices determined by using the one or more selected spatial-domain basis vectors and the one or more selected frequency-domain basis vectors. Herein, one spatial-domain basis vector and one frequency-domain basis vector that are used to construct one space-frequency component matrix may be referred to as one space-frequency vector pair.

Therefore, after obtaining the spatial-domain basis vector, the frequency-domain basis vector, and the space-frequency combination coefficient that may be used to construct the space-frequency matrix, the network device may further determine, based on the constructed space-frequency matrix, a precoding vector corresponding to each frequency domain unit.

For ease of understanding the embodiments, before the embodiments are described, the following descriptions are first provided.

First, in this embodiment, "used for indication" may include used for direct indication and used for indirect indication. For example, that the indication information is described as being used to indicate information I may include a direct indication I or an indirect indication I of the indication information, but it does not mean that the indication information necessarily carries I.

Information indicated by the indication information may be referred to as to-be-indicated information. In a specific implementation process, the to-be-indicated information may be indicated in many manners. For example, but not limited to, the to-be-indicated information may be directly indicated, for example, the to-be-indicated information itself or an index of the to-be-indicated information. Alternatively, the to-be-indicated information may be indirectly indicated by indicating other information, where an association relationship exists between the other information and the to-be-indicated information. Alternatively, only a part of the to-be-indicated information may be indicated, and another part of the to-be-dated information is known or agreed in advance. For example, specific information may further be indicated based on a pre-agreed (for example, a protocol specified) arrangement order of all information, to reduce indication overheads to some extent. In addition, a common part of all information may further be identified and indicated together, to reduce indication overheads caused by separately indicating the same information. For example, a person skilled in the art should understand that a precoding matrix includes precoding vectors, and the precoding vectors in the precoding matrix may have a same part in terms of composition or another attribute.

In addition, specific indication manners may be various existing indication manners, for example, but not limited to, the foregoing indication manners and various combinations thereof. For specific details of various indication manners, refer to the existing technology. Details are not described herein. It can be understood from the foregoing description that, for example, when a plurality of pieces of information of a same type needs to be indicated, indication manners for different information may be different. In a specific implementation process, a required indication manner may be selected based on a specific requirement. The selected indication manner is not limited in the embodiments. In this way, the indication manners in the embodiments should be understood as covering various methods that enable a to-be-indicated party to learn of to-be-indicated information.

In addition, the to-be-indicated information may have another equivalent form. For example, a row vector may be represented as a column vector; a matrix may be represented by using a transpose matrix of the matrix, or a matrix may be represented in a form such as a vector or an array, where the vector or the array may be formed by connecting row vectors or column vectors in the matrix to each other; and a Kronecker product of two vectors may be represented in a form such as a product of a transpose vector of one vector and a transpose vector of another vector. The solutions provided in the embodiments should be understood as covering various forms. For example, some or all of features in the embodiments should be understood as covering various representation forms of the features.

The to-be-indicated information may be sent as a whole, or may be divided into a plurality of pieces of sub-information for separately sending, and sending periods and/or sending occasions of these pieces of sub-information may be the same or different. A specific sending method is not limited in the embodiment. The sending periods and/or the sending occasions of these pieces of sub-information may be predefined, for example, predefined according to a protocol; or may be configured by a transmit end device by sending configuration information to a receive end device. The configuration information may include, for example, but is not limited to, one or a combination of at least two of radio resource control signaling such as RRC signaling, MAC layer signaling such as MAC-CE signaling, and physical layer signaling such as downlink control information (DCI).

The following describes solutions in detail with reference to the accompanying drawings. The technical solutions in the embodiments may be applied to various wireless communications systems based on a frequency division duplexing (FDD) mode, for example, a long term evolution (LTE) system and a fifth generation ($5^{th}$ generation, 5G) system such as a new radio (NR) system, and a future communications system such as a 6G system.

All aspects, embodiments, or features are presented in the embodiments by describing a system that may include a plurality of devices, components, modules, and the like. It should be appreciated and understood that, each system may include another device, component, module, and the like, and/or may not include all devices, components, modules, and the like discussed with reference to the accompanying drawings. In addition, a combination of these solutions may be used.

In addition, in the embodiments, the terms such as "example" and "for example" are used to represent giving an example, an illustration, or a description. Any embodiment or design scheme described as "example" and "for example" in the embodiments should not be explained as being more preferred or having more advantages than another embodiment or design scheme. Exactly, the term "example" is used to present a concept in a specific manner.

The network architecture and the service scenario described in the embodiments are intended to describe the solutions in the embodiments more clearly, and do not constitute a limitation on the solutions provided in the embodiments. A person of ordinary skill in the art may know that with evolution of the network architecture and emergence of a new service scenario, the solutions provided in the embodiments are also applicable to a similar problem.

In the embodiments, a scenario of an NR system in a wireless communications system is used as an example for description. It should be noted that the solutions provided in the embodiments may be further applied to another wireless communications network supporting an FDD duplex mode, for example, an LTE system or an evolved LTE system. A corresponding name may also be replaced with a name of a corresponding function in the another wireless communications network.

For ease of understanding the embodiments, a communications system shown in FIG. 1 is first used as an example to describe in detail the wireless communications system applicable to the embodiments. As shown in FIG. 1, the communications system includes a terminal device and a network device. There may be one or more terminal devices and network devices, and the terminal device and the network device each may be configured with one or more antennas.

The network device is a communications device having a wireless transceiver function or a chip disposed in the communications device. The network device includes, but is not limited to, an evolved NodeB (eNB), a radio network controller (RNC), a NodeB (NB), a base station controller (base station controller, BSC), a base transceiver station (BTS), a home base station (for example, a home evolved NodeB or a home NodeB HNB), a baseband unit (BBU), an access point (AP) in a wireless fidelity (Wi-Fi) system, a wireless relay node, a wireless backhaul node, or a transmission and reception point (transmission and reception point TRP or a transmission point TP); may be a gNB or a transmission and reception point (TRP or TP) in a 5G system such as an NR system, or one or more groups (including a plurality of antenna panels) of a base station in a 5G system; or may be a network node constructing a gNB or a transmission and reception point, for example, a BBU or a distributed unit (DU).

In some deployments, the gNB may include a centralized unit (CU) and a DU. The gNB may further include a radio unit (RU). The CU implements some functions of the gNB, and the DU implements other functions of the gNB. For example, the CU implements functions of a radio resource control (RRC) layer and a packet data convergence protocol ( ) layer; and the DU implements functions of a radio link control (RLC) layer, a media access control (MAC) layer, and a physical (PHY) layer. Information at the RRC layer eventually becomes information at the physical layer, or is converted from information at the physical layer. Therefore, in this architecture, higher layer signaling, for example, RRC layer signaling, may also be considered to be sent by the DU or the DU+RU. It may be understood that the network device may be a CU node, a DU node, or a device including a CU node and a DU node. In addition, the CU may be classified as a network device in an access network RAN, or the CU may be classified as a network device in a core network CN. This is not limited herein.

The terminal may also be referred to as user equipment (UE), an access terminal, a subscriber unit, a subscriber station, a mobile station, a mobile console, a remote station, a remote terminal, a mobile device, a user terminal, a wireless communication device, a user agent, a user apparatus, or the like. The terminal device in the embodiments may be a mobile phone, a pad or tablet, a computer having a wireless transceiver function, a virtual reality (VR) terminal device, an augmented reality (AR) terminal device, a wireless terminal in industrial control, a wireless terminal in self driving, a wireless terminal in telemedicine (remote medical), a wireless terminal in a smart grid, a wireless terminal in transportation safety, a wireless terminal in a smart city, a wireless terminal in a smart home, or the like. An application scenario is not limited in this embodiment. In the embodiments, the terminal device and the chip that may be disposed in the terminal device are collectively referred to as a terminal device.

Figure 2:
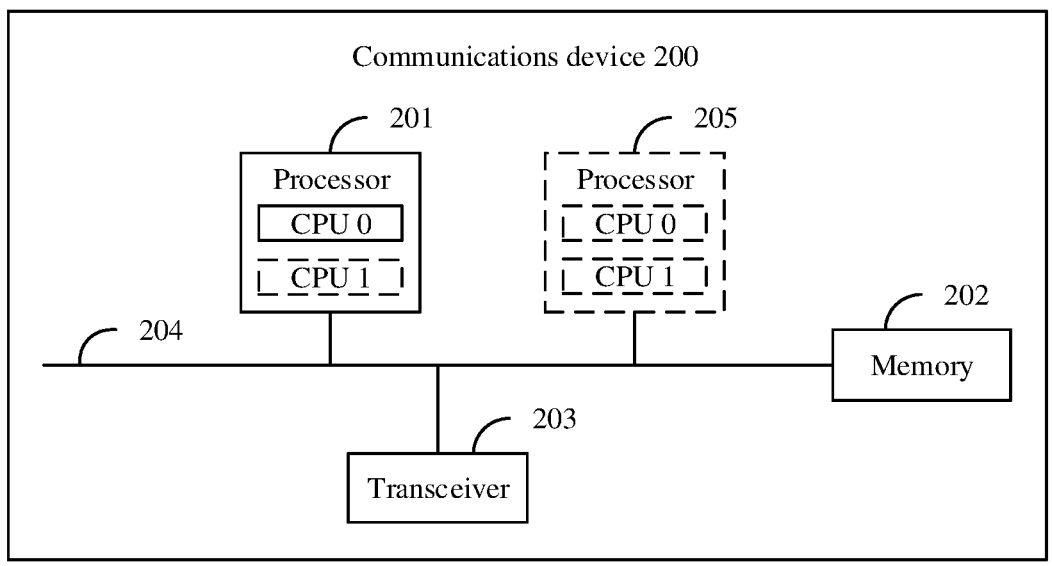
FIG. 2 is a schematic structural diagram of a communications device according to an embodiment.

An embodiment provides a communications device. The communications device may be the terminal device or the network device in the communications system shown in FIG. 1. FIG. 2 is a schematic structural diagram of a communications device according to an embodiment. As shown in FIG. 2, the communications device 200 may include at least one processor 201, a memory 202, a transceiver 203, and a communications bus 204.

The following describes each component of the communications device with reference to FIG. 2.

The processor 201 is a control center of the communications device, and may be one processor, or may be a general term of a plurality of processing elements. For example, the processor 201 may be a central processing unit (CPU), or an application-specific integrated circuit (ASIC), or may be configured as one or more integrated circuits implementing this embodiment of the present invention, for example, one or more microprocessors (DSP) or one or more field programmable gate arrays (FPGA).

The processor 201 may perform various functions of the communications device by running or executing a software program stored in the memory 202 and invoking data stored in the memory 202.

During specific implementation, in an embodiment, the processor 201 may include one or more CPUs, for example, a CPU 0 and a CPU 1 shown in FIG. 2.

During specific implementation, in an embodiment, the communications device may include a plurality of processors, for example, the processor 201 and a processor 205 shown in FIG. 2. Each of these processors may be a single-core processor (or a single-CPU) or a multi-core processor (or a multi-CPU). The processor herein may be one or more devices, circuits, and/or processing cores configured to process data (for example, computer program instructions).

The memory 202 may be a read-only memory (ROM) or another type of static storage device capable of storing static information and instructions, or a random access memory (RAM) or another type of dynamic storage device capable of storing information and instructions; or may be an electrically erasable programmable read-only memory (EEPROM), a compact disc read-only memory (CD-ROM), another optical disc storage device, an optical disc storage device (including a compact disc, a laser disc, a compact disc, a digital versatile disc (DVD), a Blu-ray disc, or the like), a disk storage medium or another magnetic storage device, or any other medium capable of carrying and storing desired program code that has a form of an instruction or a data structure and capable of being accessed by a computer. The embodiments are not limited thereto. The memory 202 may exist independently, and is connected to the processor 201 by using the communications bus 204. Alternatively, the memory 202 may be integrated with the processor 201. The memory 202 is configured to store a software program for executing the solutions of the present invention, and the processor 201 controls the execution.

The transceiver 203 is configured to communicate with another communications device. Additionally, the transceiver 203 may further be configured to communicate with a communications network, for example, an Ethernet, a radio access network (RAN), or a wireless local area network (WLAN). The transceiver 203 may include a receiving unit to implement a receiving function, and a sending unit to implement a sending function.

The communications bus 204 may be an industry standard architecture (ISA) bus, a peripheral component interconnect (PCI) bus, an extended industry standard architecture ( ) bus, or the like. The bus may be classified into an address bus, a data bus, a control bus, and the like. For ease of representation, only one thick line is used to represent the bus in FIG. 2, but this does not mean that there is only one bus or only one type of bus.

The structure of the communications device shown in FIG. 2 does not constitute a limitation on the communications device. The communications device may include more or fewer components than those shown in the figure, or some components may be combined, or a different component arrangement may be used.

Figure 3:
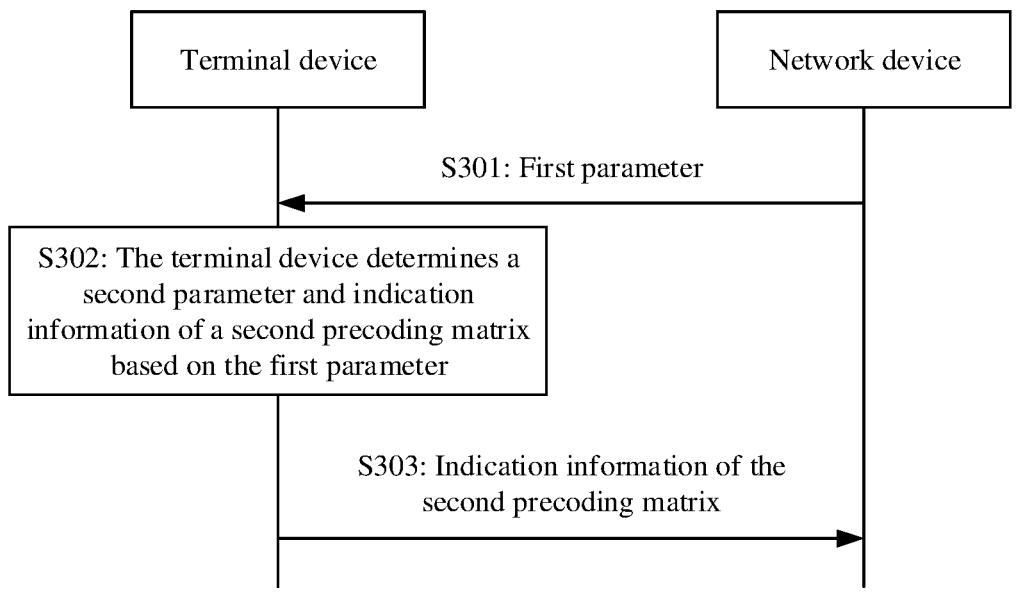
FIG. 3 is a schematic flowchart of a communication method according to an embodiment.

FIG. 3 is a schematic flowchart of a communication method according to an embodiment. The communication method is applied to a terminal device or a network device. As shown in FIG. 3, the communication method includes the following steps.

S301: The network device sends a first parameter to the terminal device. Correspondingly, the terminal device receives the first parameter from the network device.

For example, the network device may send the first parameter to the terminal device on a downlink by using higher layer signaling.

The first parameter is used to determine indication information of a first precoding matrix. For details, refer to an existing implementation. The details are not described in this embodiment.

In addition, the first parameter is also used to determine a second parameter. For a specific implementation, refer to a related description in S302. Details are not described herein again.

For example, the first parameter may include one or more of the following parameters: a quantity of first frequency domain units, a quantity of first spatial-domain basis vectors, a quantity or a ratio of first frequency-domain basis vectors, and a quantity or a ratio of first space-frequency combination coefficients. Correspondingly, the second parameter may include one or more of the following parameters: a quantity of second frequency domain units, a quantity of second spatial-domain basis vectors, a quantity or a ratio of second frequency-domain basis vectors, and a quantity or a ratio of second space-frequency combination coefficients.

It should be noted that the first parameter is a parameter set corresponding to a first rank indicator value; and when the first rank indicator value is indicated, the parameter set includes a set including a parameter value corresponding to each spatial layer. The second parameter is a parameter set corresponding to a second rank indicator value; and when the second rank indicator value is indicated, the parameter set includes a set including a parameter value corresponding to each spatial layer. That is, when a respective corresponding rank indicator value is indicated, the first parameter or the second parameter indicates the parameter set including the parameter value corresponding to each spatial layer. Each spatial layer may correspond to a same or a different parameter value.

For example, for a same rank indicator value, to improve control precision, different parameter values may be respectively used for a plurality of spatial layers under the rank indicator value. It can be understood that, for a same rank indicator value, to simplify a control procedure, a same parameter value may be used for a plurality of spatial layers under the rank indicator value. In addition, the first rank indicator value is usually 1 or 2, which is a relatively small value and corresponds to a relatively small quantity of spatial layers, for example, one or two layers. Therefore, to further simplify a control procedure, a same value of the first parameter may further be used for one spatial layer whose first rank indicator value is 1 and two spatial layers whose first rank indicator value is 2.

In this embodiment, an example in which a parameter corresponding to a rank indicator value 1 or 2 is used as the first parameter and a parameter corresponding to a rank indicator value 3 or 4 is used as the second parameter is used to describe the first parameter and the second parameter that are provided in this embodiment.

It should be noted that, in addition to the first parameter, the network device may further deliver another parameter to the terminal device, for example, one or more first indexes in a first correspondence described in the following S302 and one or more second indexes in the second correspondence. For the first index and the second index, refer to related descriptions in S302. Details are not described herein again.

S302: The terminal device determines the second parameter and indication information of a second precoding matrix based on the first parameter.

In a possible method, that the terminal device determines the second parameter and indication information of a second precoding matrix based on the first parameter in S302 may include the following steps.

Step 1: The terminal device determines a candidate value of the second parameter based on the first correspondence.

Step 2: The terminal device determines the second parameter and the indication information of the second precoding matrix based on channel sounding results corresponding to all candidate values of the second parameter.

The first correspondence includes one or more of the following correspondences: a correspondence between a quantity of first spatial-domain basis vectors and a quantity of second spatial-domain basis vectors; a correspondence between a quantity of first frequency-domain basis vectors and a quantity of second frequency-domain basis vectors; a correspondence between a ratio of first frequency-domain basis vectors and a ratio of second frequency-domain basis vectors; a correspondence between a quantity of first frequency domain units and a ratio of first frequency-domain basis vectors, and a quantity of second frequency-domain basis vectors; a correspondence between a quantity of first space-frequency combination coefficients and a quantity of second space-frequency combination coefficients; a correspondence between a ratio of first space-frequency combination coefficients and a ratio of second space-frequency combination coefficients; a correspondence between a quantity of first spatial-domain basis vectors, a quantity of first frequency-domain basis vectors, and a ratio of first space-frequency combination coefficients, and a quantity of second space-frequency combination coefficients; a correspondence between a quantity of first spatial-domain basis vectors and a quantity of first frequency-domain basis vectors, and a quantity of second spatial-domain basis vectors and a quantity of second frequency-domain basis vectors; a correspondence between a quantity of first spatial-domain basis vectors and a ratio of first frequency-domain basis vectors, and a quantity of second spatial-domain basis vectors and a ratio of second frequency-domain basis vectors; a correspondence between a quantity of first spatial-domain basis vectors and a quantity of first space-frequency combination coefficients, and a quantity of second spatial-domain basis vectors and a quantity of second space-frequency combination coefficients; and a correspondence between a quantity of first spatial-domain basis vectors and a ratio of first space-frequency combination coefficients, and a quantity of second spatial-domain basis vectors and a ratio of second space-frequency combination coefficients.

First, an example in which the rank indicator value 1 or 2 is used as the first rank indicator value, the rank indicator value 3 or 4 is used as the second rank indicator value, a parameter corresponding to the first rank indicator value is used as the first parameter, and a parameter corresponding to the second rank indicator value is used as the second parameter is used to describe various correspondences in the first correspondence in detail. The first parameter is represented by a subscript 1. In the second parameter, a parameter whose second rank indicator value is 3 is represented by a subscript 2, and a parameter whose second rank indicator value is 4 is represented by a number 3.

For example, the first parameter may include a parameter or a parameter set when the first rank indicator value is 1 or 2. For example, the parameter or a parameter set may be a parameter subset, including one or more parameters, in the following parameter set: $\{N_{f1}, L_1, M_1 \text{ or } p_1, K_{0,1} \text{ or } \beta_1\}$, where $N_{f1}$ is the quantity of first frequency domain units, $L_1$ is the quantity of first spatial-domain basis vectors, $M_1$ is the quantity of first frequency-domain basis vectors, $p_1$ is the ratio of first frequency-domain basis vectors, $K_{0,1}$ is the quantity of first space-frequency combination coefficients, and $\beta_1$ is the ratio of first space-frequency combination coefficients.

For example, when the second rank indicator value is 3, the second parameter may be a parameter subset, including one or more parameters, in the following parameter set: $\{N_{f2}, L_2, M_2 \text{ or } p_2, K_{0,2} \text{ or } \beta_2\}$, where $N_{f2}$ is a quantity of second frequency domain units, $L_2$ is the quantity of second spatial-domain basis vectors, $M_2$ is the quantity of second frequency-domain basis vectors, $p_2$ is the ratio of second frequency-domain basis vectors, $K_{0,2}$ is the quantity of second space-frequency combination coefficients, and $\beta_2$ is the ratio of second space-frequency combination coefficients.

For example, when the second rank indicator value is 4, the second parameter may be a parameter subset, including one or more parameters, in the following parameter set: $\{N_{f3}, L_3, M_3 \text{ or } p_3, K_{0,3} \text{ or } \beta_3\}$, where $N_{f3}$ is a quantity of second frequency domain units, $L_3$ is the quantity of second spatial-domain basis vectors, $M_3$ is the quantity of second frequency-domain basis vectors, $p_3$ is the ratio of second frequency-domain basis vectors, $K_{0,3}$ is the quantity of second space-frequency combination coefficients, and $\beta_3$ is the ratio of second space-frequency combination coefficients.

For example, Table 1 shows a correspondence between the quantity of first spatial-domain basis vectors and the quantity of second spatial-domain basis vectors. As shown in Table 1, for each quantity $L_1$ of first spatial-domain basis vectors, there are a total of four candidate value sets of quantities of second spatial-domain basis vectors. In total, each candidate value set includes one first index, one set of one or more quantities $L_2$ of second spatial-domain basis vectors when the second rank indicator value is 3, and one set of one or more quantities $L_2$ of second spatial-domain basis vectors when the second rank indicator value is 4. The set of one or more quantities $L_2$ of second spatial-domain basis vectors when the second rank indicator value is 3 includes a total of three values, which respectively correspond to three spatial layers when the second rank indicator value is 3. The set of one or more quantities $L_2$ of second spatial-domain basis vectors when the second rank indicator value is 4 includes a total of four values, which respectively correspond to four spatial layers when the second rank indicator value is 4. That is, in Table 1, one $L_1$ corresponds to a plurality of first indexes, a plurality of $L_2$, and a plurality of $L_3$. In addition, for a same $L_1$, one first index corresponds to one $L_2$, and one first index corresponds to one $L_3$.

TABLE 1

| | | $L_2$ | | | $L_3$ | | | |
|---|---|---|---|---|---|---|---|---|
| $L_1$ | First index | Layer 1 | Layer 2 | Layer 3 | Layer 1 | Layer 2 | Layer 3 | Layer 4 |
| 2 | 0 | 2 | 1 | 1 | 1 | 1 | 1 | 1 |
| | 1 | 2 | 1 | 1 | 2 | 2 | 1 | 1 |
| | 2 | 2 | 2 | 1 | 1 | 1 | 1 | 1 |
| | 3 | 2 | 2 | 1 | 2 | 2 | 1 | 1 |

TABLE 1-continued

| | | $L_2$ | | | $L_3$ | | | |
|---|---|---|---|---|---|---|---|---|
| $L_1$ | First index | Layer 1 | Layer 2 | Layer 3 | Layer 1 | Layer 2 | Layer 3 | Layer 4 |
| 4 | 0 | 4 | 2 | 2 | 2 | 2 | 2 | 2 |
| | 1 | 4 | 2 | 2 | 3 | 2 | 2 | 1 |
| | 2 | 4 | 3 | 1 | 2 | 2 | 2 | 2 |
| | 3 | 4 | 3 | 1 | 3 | 2 | 2 | 1 |
| 6 | 0 | 6 | 3 | 3 | 3 | 3 | 3 | 3 |
| | 1 | 6 | 3 | 3 | 4 | 3 | 3 | 2 |
| | 2 | 6 | 4 | 2 | 3 | 3 | 3 | 3 |
| | 3 | 6 | 4 | 2 | 4 | 3 | 3 | 2 |

In this embodiment, the terminal device may find, from Table 1 based on one $L_1$, four candidate value sets of quantities of second spatial-domain basis vectors, where the four candidate value sets correspond to the $L_1$ and each include $L_2$ and $L_3$. Then, the terminal device may traverse the four candidate value sets based on a channel sounding result; and select, based on the sounding result, a second rank indicator value optimally adapted to a current channel status, a quantity of spatial layers that corresponds to the second rank indicator value, and a quantity of second spatial-domain basis vectors of each spatial layer. For example, $L_1=2$, and the quantity of spatial-domain basis vectors corresponding to each spatial layer when the first rank indicator value is 1 or 2 is represented. If it is assumed that a channel sounding result with the first index being 1 and the second rank indicator value being 4 is optimal, it is determined that the first index that needs to be reported is 1, the second rank indicator value is 4, and four quantities $L_3$ of second spatial-domain basis vectors corresponding to four spatial layers are 2, 2, 1, and 1 in ascending order of numbers of the spatial layers. For another example, $L_1=4$. If it is assumed that a channel sounding result with the first index being 2 and the second rank indicator value being 3 is optimal, it is determined that the first index that needs to be reported is 2, the second rank indicator value is 3, and three quantities $L_3$ of second spatial-domain basis vectors corresponding to three spatial layers are 4, 3, and 1 in ascending order of numbers of the spatial layers.

It should be noted that the correspondence between the quantity of first spatial-domain basis vectors and the quantity of second spatial-domain basis vectors shown in Table 1 is a numerical relationship. It can be understood that the correspondence between the quantity of first spatial-domain basis vectors and the quantity of second spatial-domain basis vectors may alternatively be a proportional relationship. Table 2 shows a correspondence between the quantity of first spatial-domain basis vectors and a ratio between the quantity of second spatial-domain basis vectors and the quantity of first spatial-domain basis vectors. The terminal device may search, based on the quantity of first spatial-domain basis vectors and the first index, for a ratio between the quantity of second spatial-domain basis vectors and the quantity of first spatial-domain basis vectors that correspond to each spatial layer when the second rank indicator value is 3 or 4; and calculate, based on the ratio and the quantity of first spatial-domain basis vectors, the quantity of second spatial-domain basis vectors corresponding to each spatial layer when the second rank indicator value is 3 or 4. For example, if the quantity of first spatial-domain basis vectors is L and the first index is 3, the found ratios between the quantities of second spatial-domain basis vectors and the quantities of first spatial-domain basis vectors that correspond to each spatial layer when the second rank indicator value is 3 or 4 are L, L, L/2, L, L, L/2, and L/2 in ascending order of numbers of the spatial layers. If it is assumed that L=4, quantities of second spatial-domain basis vectors corresponding to three spatial layers when the second rank indicator value is 3 are 4, 4, and 2 in ascending order of numbers of the spatial layers, and quantities of second spatial-domain basis vectors corresponding to four spatial layers when the second rank indicator value is 4 are 4, 4, 2, and 2 in ascending order of numbers of the spatial layers.

TABLE 2

| $L_1$ | First index | $L_2$ | | | $L_3$ | | | |
| | | Layer 1 | Layer 2 | Layer 3 | Layer 1 | Layer 2 | Layer 3 | Layer 4 |
| --- | --- | --- | --- | --- | --- | --- | --- | --- |
| L | 0 | L | L/2 | L/2 | L/2 | L/2 | L/2 | L/2 |
| | 1 | L | L/2 | L/2 | L | L | L/2 | L/2 |
| | 2 | L | L | L/2 | L/2 | L/2 | L/2 | L/2 |
| | 3 | L | L | L/2 | L | L | L/2 | L/2 |

For example, Table 3 shows a correspondence between the quantity of first frequency-domain basis vectors and the quantity of second frequency-domain basis vectors. As shown in Table 3, for each quantity $M_1$ of first frequency-domain basis vectors, there are a total of four candidate value sets of quantities of second frequency-domain basis vectors. In total, each candidate value set includes one first index, one set of one or more quantities $M_2$ of second frequency-domain basis vectors when the second rank indicator value is 3, and one set of one or more quantities $M_2$ of second frequency-domain basis vectors when the second rank indicator value is 4. The set of one or more quantities $M_2$ of second frequency-domain basis vectors when the second rank indicator value is 3 includes a total of three values, which respectively correspond to three spatial layers when the second rank indicator value is 3. The set of one or more quantities $M_2$ of second frequency-domain basis vectors when the second rank indicator value is 4 includes a total of four values, which respectively correspond to four spatial layers when the second rank indicator value is 4. That is, in Table 3, one $M_1$ corresponds to a plurality of first indexes, a plurality of $M_2$, and a plurality of $M_3$. In addition, for a same $M_1$, one first index corresponds to one $M_2$ and one $M_3$.

TABLE 3

| $M_1$ | First index | $M_2$ | | | $M_3$ | | | |
| | | Layer 1 | Layer 2 | Layer 3 | Layer 1 | Layer 2 | Layer 3 | Layer 4 |
| --- | --- | --- | --- | --- | --- | --- | --- | --- |
| 10 | 0 | 10 | 5 | 5 | 5 | 5 | 5 | 5 |
| | 1 | 10 | 6 | 4 | 5 | 5 | 5 | 5 |
| | 2 | 10 | 5 | 5 | 6 | 5 | 5 | 4 |
| | 3 | 10 | 6 | 4 | 6 | 5 | 5 | 4 |
| 9 | 0 | 9 | 5 | 5 | 5 | 5 | 5 | 5 |
| | 1 | 9 | 6 | 4 | 5 | 5 | 5 | 5 |
| | 2 | 9 | 5 | 5 | 6 | 5 | 5 | 3 |
| | 3 | 9 | 6 | 4 | 6 | 5 | 4 | 3 |
| 8 | 0 | 8 | 4 | 4 | 4 | 4 | 4 | 4 |
| | 1 | 8 | 5 | 3 | 4 | 4 | 4 | 4 |
| | 2 | 8 | 4 | 4 | 5 | 4 | 4 | 3 |
| | 3 | 8 | 5 | 3 | 5 | 4 | 4 | 3 |
| 7 | 0 | 7 | 4 | 4 | 4 | 4 | 4 | 4 |
| | 1 | 7 | 4 | 4 | 4 | 4 | 3 | 3 |

TABLE 3-continued

| $M_1$ | First index | $M_2$ | | | $M_3$ | | | |
| | | Layer 1 | Layer 2 | Layer 3 | Layer 1 | Layer 2 | Layer 3 | Layer 4 |
| --- | --- | --- | --- | --- | --- | --- | --- | --- |
| | 2 | 5 | 5 | 4 | 5 | 4 | 3 | 2 |
| | 3 | 6 | 5 | 3 | 4 | 4 | 3 | 3 |
| 6 | 0 | 6 | 3 | 3 | 3 | 3 | 3 | 3 |
| | 1 | 5 | 4 | 3 | 3 | 3 | 3 | 3 |
| | 2 | 6 | 3 | 3 | 4 | 3 | 3 | 2 |
| | 3 | 5 | 4 | 3 | 4 | 3 | 3 | 2 |
| 5 | 0 | 5 | 3 | 3 | 3 | 3 | 3 | 3 |
| | 1 | 5 | 4 | 2 | 3 | 3 | 3 | 3 |
| | 2 | 5 | 3 | 3 | 4 | 3 | 2 | 2 |
| | 3 | 5 | 4 | 2 | 4 | 3 | 2 | 2 |
| 4 | 0 | 3 | 3 | 2 | 2 | 2 | 2 | 2 |
| | 1 | 4 | 2 | 2 | 2 | 2 | 2 | 2 |
| | 2 | 3 | 3 | 2 | 3 | 2 | 2 | 1 |
| | 3 | 4 | 2 | 2 | 3 | 2 | 2 | 1 |
| 3 | 0 | 3 | 2 | 2 | 2 | 2 | 2 | 2 |
| | 1 | 2 | 2 | 2 | 2 | 2 | 1 | 1 |
| | 2 | 3 | 2 | 2 | 2 | 2 | 2 | 2 |
| | 3 | 2 | 2 | 2 | 2 | 2 | 1 | 1 |
| 2 | 0 | 2 | 1 | 1 | 1 | 1 | 1 | 1 |
| | 1 | 2 | 1 | 1 | 2 | 2 | 1 | 1 |
| | 2 | 2 | 2 | 1 | 1 | 1 | 1 | 1 |
| | 3 | 2 | 2 | 1 | 2 | 2 | 1 | 1 |
| 1 | 0 | 1 | 1 | 1 | 1 | 1 | 1 | 1 |

In this embodiment, the terminal device may find, from Table 3 based on one $M_1$, four candidate value sets of quantities of second frequency-domain basis vectors, where the four candidate value sets correspond to the $M_1$ and each include $M_2$ and $M_3$. Then, the terminal device may traverse the four candidate value sets for channel sounding; and select, based on a sounding result, a second rank indicator value optimally adapted to a current channel status, a quantity of spatial layers that corresponds to the second rank indicator value, and a quantity of second frequency-domain basis vectors of each spatial layer.

For example, $M_1=7$. If it is assumed that a channel sounding result with the first index being 1 and the second rank indicator value being 4 is optimal, it is determined that the first index that needs to be reported is 1, the second rank indicator value is 4, and four quantities $M_3$ of second frequency-domain basis vectors corresponding to four spatial layers are 4, 4, 3, and 3 in ascending order of numbers of the spatial layers. For another example, $M_1=4$. If it is assumed that a channel sounding result with the first index being 2 and the second rank indicator value being 3 is optimal, it is determined that the first index that needs to be reported is 2, the second rank indicator value is 3, and three quantities $M_3$ of second frequency-domain basis vectors corresponding to three spatial layers are 3, 3, and 2 in ascending order of numbers of the spatial layers.

It should be noted that the correspondence between the quantity of first frequency-domain basis vectors and the quantity of second frequency-domain basis vectors shown in Table 3 is a numerical relationship. It can be understood that the correspondence between the quantity of first frequency-domain basis vectors and the quantity of second frequency-domain basis vectors may alternatively be a proportional relationship. Table 4 shows a correspondence between the quantity of first frequency-domain basis vectors and a ratio between the quantity of second frequency-domain basis vectors and the quantity of first frequency-domain basis vectors. The terminal device may search, based on the quantity of first frequency-domain basis vectors and the first index, for a ratio between the quantity of second frequency-domain basis vectors and the quantity of first frequency-domain basis vectors that correspond to each spatial layer when the second rank indicator value is 3 or 4; and calculate, based on the ratio and the quantity of first frequency-domain basis vectors, the quantity of second frequency-domain basis vectors corresponding to each spatial layer when the second rank indicator value is 3 or 4.

For example, if the quantity of first frequency-domain basis vectors is M and the first index is 3, the found ratios between the quantities of second frequency-domain basis vectors and the quantities of first frequency-domain basis vectors that correspond to each spatial layer when the second rank indicator value is 3 or 4 are M, M, M/2, M, M, second polarization direction; and in some other scenarios, the first polarization direction needs to be weaker than the second polarization direction. It can be understood that a control granularity required by a strong polarization direction is generally higher than that required by a weak polarization direction. Therefore, a quantity of frequency-domain basis vectors required by the strong polarization direction is larger. For example, as shown in Table 5, for $M_1=7$, the first index is 0. When the second rank indicator value is 3, second frequency-domain basis vectors corresponding to the strong polarization direction and the weak polarization direction corresponding to a spatial layer 1 are respectively 7 and 4.

TABLE 5

| | | $M_2$ | | | | | $M_3$ | | | | | | | |
|---|---|---|---|---|---|---|---|---|---|---|---|---|---|---|
| | | Layer 1 | | Layer 2 | | Layer 3 | | Layer 1 | | Layer 2 | | Layer 3 | | Layer 4 | |
| $M_1$ | First index | Strong polarization direction | Weak polarization direction | Strong polarization direction | Weak polarization direction | Strong polarization direction | Weak polarization direction | Strong polarization direction | Weak polarization direction | Strong polarization direction | Weak polarization direction | Strong polarization direction | Weak polarization direction | Strong polarization direction | Weak polarization direction |
| 7 | 0 | 7 | 4 | 6 | 3 | 6 | 3 | 6 | 3 | 4 | 2 | 6 | 3 | 4 | 2 |
| | 1 | 7 | 4 | 6 | 3 | 6 | 3 | 5 | 3 | 5 | 3 | 5 | 2 | 5 | 2 |
| | 2 | 7 | 4 | 5 | 4 | 5 | 4 | 6 | 3 | 4 | 2 | 6 | 3 | 4 | 2 |
| | 3 | 7 | 4 | 5 | 4 | 5 | 4 | 5 | 3 | 5 | 3 | 5 | 2 | 5 | 2 |
| 4 | 0 | 4 | 2 | 3 | 2 | 3 | 2 | 3 | 2 | 3 | 2 | 2 | 1 | 2 | 1 |
| | 1 | 4 | 2 | 3 | 2 | 3 | 2 | 3 | 2 | 3 | 2 | 2 | 1 | 3 | 1 |
| | 2 | 4 | 2 | 4 | 1 | 4 | 1 | 3 | 2 | 3 | 2 | 2 | 1 | 2 | 1 |
| | 3 | 4 | 2 | 4 | 1 | 4 | 1 | 3 | 2 | 3 | 2 | 2 | 1 | 3 | 1 |

M/2, and M/2 in ascending order of numbers of the spatial layers. If it is assumed that M=4, quantities of second frequency-domain basis vectors corresponding to three spatial layers when the second rank indicator value is 3 are 4, 4, and 2 in ascending order of numbers of the spatial layers, and quantities of second frequency-domain basis vectors corresponding to four spatial layers when the second rank indicator value is 4 are 4, 4, 2, and 2 in ascending order of numbers of the spatial layers.

TABLE 4

| | | $M_2$ | | | $M_3$ | | | |
|---|---|---|---|---|---|---|---|---|
| $M_1$ | First index | Layer 1 | Layer 2 | Layer 3 | Layer 1 | Layer 2 | Layer 3 | Layer 4 |
| M | 0 | M | M/2 | M/2 | M/2 | M/2 | M/2 | M/2 |
| | 1 | M | M/2 | M/2 | M | M | M/2 | M/2 |
| | 2 | M | M | M/2 | M/2 | M/2 | M/2 | M/2 |
| | 3 | M | M | M/2 | M | M | M/2 | M/2 |
| | 4 | M | 2M/3 | M/3 | M/2 | M/2 | M/2 | M/2 |
| | 5 | M | 2M/3 | M/3 | M | M | M/2 | M/2 |
| | 6 | M | 2M/3 | M/3 | 2M/3 | 2M/3 | M/3 | M/3 |
| | 7 | M | 2M/3 | M/3 | 2M/3 | 2M/3 | M/3 | M/3 |

In this embodiment, precision of the correspondence between the quantity of first frequency-domain basis vectors and the quantity of second frequency-domain basis vectors shown in Table 3 or Table 4 may further be improved. Therefore, for example, as shown in Table 5, same $M_1$, a same first index, a same value of the second rank indicator value, and a same spatial layer each may correspond to different quantities of second frequency-domain basis vectors for different polarization directions.

Dual polarization is used as an example. Polarization directions generally may include a first polarization direction and a second polarization direction. In some scenarios, the first polarization direction needs to be stronger than the For example, Table 6 shows a correspondence between the ratio of first frequency-domain basis vectors and the ratio of second frequency-domain basis vectors. As shown in Table 6, for each ratio $p_1$ of first frequency-domain basis vectors, there are a total of four candidate value sets of ratios of second frequency-domain basis vectors. In total, each candidate value set includes one first index, one ratioset of one or more ratios $p_2$ of second frequency-domain basis vectors when the second rank indicator value is 3, and one ratioset of one or more ratios $p_2$ of second frequency-domain basis vectors when the second rank indicator value is 4. The ratioset of one or more ratios $p_2$ of second frequency-domain basis vectors when the second rank indicator value is 3 includes a total of three values, which respectively correspond to three spatial layers when the second rank indicator value is 3. The ratioset of one or more ratios $p_2$ of second frequency-domain basis vectors when the second rank indicator value is 4 includes a total of four values, which respectively correspond to four spatial layers when the second rank indicator value is 4. That is, in Table 6, one $p_1$ corresponds to a plurality of first indexes, a plurality of $p_2$, and a plurality of $p_3$. In addition, for a same $p_1$, one first index corresponds to one $p_2$ and one $p_3$.

In this embodiment, the terminal device may find, from Table 6 based on one $p_1$, four candidate value sets of ratios of second frequency-domain basis vectors, where the four candidate value sets correspond to the $p_1$ and each include $p_2$ and $p_3$. Then, the terminal device may traverse the four candidate value sets for channel sounding; and select, based on a sounding result, a second rank indicator value optimally adapted to a current channel status, a quantity of spatial layers that corresponds to the second rank indicator value, and a ratio of second frequency-domain basis vectors of each spatial layer. For example, if it is assumed that $p_1=p$ and a channel sounding result with the first index being 5 and the second rank indicator value being 4 is optimal, it is determined that the first index that needs to be reported is 5, the second rank indicator value is 4, and four ratios $p_3$ of second frequency-domain basis vectors corresponding to four spatial layers are p, p, p/2, and p/2 in ascending order of numbers of the spatial layers. For another example, it is assumed that $p_1=p$. If a channel sounding result with the first index being 2 and the second rank indicator value being 3 is optimal, it is determined that the first index that needs to be reported is 2, the second rank indicator value is 3, and three ratios $p_3$ of second frequency-domain basis vectors corresponding to three spatial layers are p, p, and p/2 in ascending order of numbers of the spatial layers.

It should be noted that, in a channel sounding process, the quantity $M_1$ of first frequency-domain basis vectors needs to be calculated based on the ratio $p_1$ of first frequency-domain basis vectors. Furthermore, based on the ratio $p_1$ of first frequency-domain basis vectors and Table 6, ratios $p_2$ of second frequency-domain basis vectors respectively corresponding to three spatial layers when the second rank indicator value is 3 and ratios $p_3$ of second frequency-domain basis vectors respectively corresponding to four spatial layers when the second rank indicator value is 4 are searched for. Then, the quantity $M_2$ of second frequency-domain basis vectors when the second rank indicator value is 3 is calculated based on the ratios $p_2$ of second frequency-domain basis vectors when the second rank indicator value is 3, and the quantity $M_3$ of second frequency-domain basis vectors when the second rank indicator value is 4 is calculated based on the ratios $p_3$ of second frequency-domain basis vectors when the second rank indicator value is 4. For example, a quantity of frequency-domain basis vectors may be calculated based on the following formula:

$$M = \left\lceil p \times \frac{N_f}{f} \right\rceil.$$

$N_f$ is a quantity of frequency domain units, f is a size of a frequency domain unit, and a value of the size may be a quantity of RBs or a quantity of subbands, where the quantity of RBs and the quantity of subbands are both configured values. M and p may be $M_1$ and $p_1$, $M_2$ and $p_2$, or $M_3$ and $p_3$.

It should be noted that when the second rank indicator value is 3 or 4, one p or M in the foregoing formula actually corresponds to one group of parameters or one parameter set. For example, when the second rank indicator value is 4, one M in the foregoing formula represents four values of the quantity of second frequency-domain basis vectors, and the four values are in a one-to-one correspondence with four spatial layers. For another example, when the second rank indicator value is 3, one p in the foregoing formula represents three values of a ratio relationship of second frequency-domain basis vectors, and the three values are in a one-to-one correspondence with three spatial layers.

In actual application, in view of a relatively small quantity of spatial layers when the first rank indicator value is 1 or 2, to simplify a processing procedure, a same first parameter is used for one spatial layer when the first rank indicator value is 1 and two spatial layers when the first rank indicator value is 2, that is, same M and same p are configured for the three spatial layers.

TABLE 6

|       | First index | $p_2$ Layer 1 | $p_2$ Layer 2 | $p_2$ Layer 3 | $p_3$ Layer 1 | $p_3$ Layer 2 | $p_3$ Layer 3 | $p_3$ Layer 4 |
|-------|-------------|---------------|---------------|---------------|---------------|---------------|---------------|---------------|
| $p_1$ |             |               |               |               |               |               |               |               |
| p     | 0           | p             | p/2           | p/2           | p/2           | p/2           | p/2           | p/2           |
|       | 1           | p             | p/2           | p/2           | p             | p             | p/2           | p/2           |
|       | 2           | p             | p             | p/2           | p/2           | p/2           | p/2           | p/2           |
|       | 3           | p             | p             | p/2           | p             | p             | p/2           | p/2           |
|       | 4           | p             | 2p/3          | p/3           | p/2           | p/2           | p/2           | p/2           |
|       | 5           | p             | 2p/3          | p/3           | p             | p             | p/2           | p/2           |
|       | 6           | p             | 2p/3          | p/3           | 2p/3          | 2p/3          | p/3           | p/3           |
|       | 7           | p             | 2p/3          | p/3           | 2p/3          | 2p/3          | p/3           | p/3           |

In this embodiment, precision of the correspondence between the ratio of first frequency-domain basis vectors and the ratio of second frequency-domain basis vectors shown in Table 6 may further be improved. For example, as shown in Table 7, same $p_1$, a same first index, a same value of the second rank indicator value, and a same spatial layer each may correspond to different ratios of second frequency-domain basis vectors for different polarization directions. Dual polarization is used as an example. Polarization directions generally may include a first polarization direction and a second polarization direction. In some scenarios, the first polarization direction needs to be stronger than the second polarization direction; and in some other scenarios, the first polarization direction needs to be stronger than the second polarization direction. It can be understood that a control granularity required by a strong polarization direction is generally higher than that required by a weak polarization direction. Therefore, a quantity of frequency-domain basis vectors required by the strong polarization direction is larger, that is, a ratio of frequency-domain basis vectors is larger. For example, as shown in Table 7, for $p_1=p$, the first index is 3. When the second rank indicator value is 4, ratios of second frequency-domain basis vectors corresponding to the strong polarization direction and the weak polarization direction corresponding to a spatial layer 2 are respectively 5p/6 and 5p/12.

TABLE 7

| | | $p_2$ Layer 1 | | $p_2$ Layer 2 | | $p_2$ Layer 3 | | $M_3$ Layer 1 | | $M_3$ Layer 2 | | $M_3$ Layer 3 | | $M_3$ Layer 4 | |
|---|---|---|---|---|---|---|---|---|---|---|---|---|---|---|---|
| $p_1$ | First index | Strong polarization direction | Weak polarization direction | Strong polarization direction | Weak polarization direction | Strong polarization direction | Weak polarization direction | Strong polarization direction | Weak polarization direction | Strong polarization direction | Weak polarization direction | Strong polarization direction | Weak polarization direction | Strong polarization direction | Weak polarization direction |
| p | 0 | p | p/2 | 5p/6 | 5p/12 | 5p/6 | 5p/12 | 2p/3 | p/3 | 2p/3 | p/3 | 3p/4 | p/4 | 3p/4 | p/4 |
|   | 1 | p | p/2 | 2p/3 | p/3 | 2p/3 | p/3 | 2p/3 | p/3 | 2p/3 | p/3 | 3p/4 | p/4 | 3p/4 | p/4 |
|   | 2 | p | p/2 | 5p/6 | 5p/12 | 5p/6 | 5p/12 | 5p/6 | 5p/12 | 5p/6 | 5p/12 | 2p/3 | p/3 | 2p/3 | p/3 |
|   | 3 | p | p/2 | 2p/3 | p/3 | 2p/3 | p/3 | 5p/6 | 5p/12 | 5p/6 | 5p/12 | 2p/3 | p/3 | 2p/3 | p/3 |

For example, Table 8 shows a correspondence between the quantity of first frequency domain units and the ratio of first frequency-domain basis vectors, and the quantity of second frequency-domain basis vectors. As shown in Table 8, one first parameter set $\{N_{f1}, p_1\}$ including the quantity $N_{f1}$ of first frequency domain units and the ratio $p_1$ of first frequency-domain basis vectors has a total of four candidate value sets of quantities of second frequency-domain basis vectors. In total, each candidate value set includes one first index, one set of one or more quantities $M_2$ of second frequency-domain basis vectors when the second rank indicator value is 3, and one set of one or more quantities $M_2$ of second frequency-domain basis vectors when the second rank indicator value is 4. The set of one or more quantities $M_2$ of second frequency-domain basis vectors when the second rank indicator value is 3 includes a total of three values, which respectively correspond to three spatial layers when the second rank indicator value is 3. The set of one or more quantities $M_2$ of second frequency-domain basis vectors when the second rank indicator value is 4 includes a total of four values, which respectively correspond to four spatial layers when the second rank indicator value is 4. That is, in Table 8, one group of $\{N_{f1}, p_1\}$ corresponds to a plurality of first indexes, a plurality of $M_2$, and a plurality of $M_3$. In addition, for a same group of $\{N_{f1}, p_1\}$, one first index corresponds to one $M_2$ and one $M_3$.

In this embodiment, the terminal device may find, from Table 8 based on one group of $\{N_{f1}, p_1\}$, four candidate value sets of quantities of second frequency-domain basis vectors, where the four candidate value sets correspond to this group of $\{N_{f1}, p_1\}$ and each include $M_2$ and $M_3$. Then, the terminal device may traverse the four candidate value sets for channel sounding; and select, based on a sounding result, a second rank indicator value optimally adapted to a current channel status, a quantity of spatial layers that corresponds to the second rank indicator value, and a quantity of second frequency-domain basis vectors of each spatial layer. For example, $\{N_{f1}=13, p_1=\frac{1}{2}\}$. If it is assumed that a channel sounding result with the first index being 1 and the second rank indicator value being 4 is optimal, it is determined that the first index that needs to be reported is 1, the second rank indicator value is 4, and four quantities $M_3$ of second frequency-domain basis vectors corresponding to four spatial layers are 4, 4, 3, and 3 in ascending order of numbers of the spatial layers. For another example, $\{N_{f1}=4, p_1=\frac{1}{2}\}$. If it is assumed that a channel sounding result with the first index being 2 and the second rank indicator value being 3 is optimal, it is determined that the first index that needs to be reported is 2, the second rank indicator value is 3, and three quantities $M_3$ of second frequency-domain basis vectors corresponding to three spatial layers are 2, 2, and 1 in ascending order of numbers of the spatial layers.

It should be noted that an actual configured preset configuration table or configuration pattern may alternatively be a part of Table 8. For example, the column in which $L_1$ is located may not be included, in other words, values of $M_2$ and $M_3$ are merely related to $N_{f1}/f$ and $p_1$.

TABLE 8

| $N_{f1}/f$ | $L_1$ | $p_1$ | First index | $M_2$ Layer 1 | $M_2$ Layer 2 | $M_3$ Layer 1 | $M_3$ Layer 2 | $M_3$ Layer 2 | $M_3$ Layer 3 | $M_3$ Layer 1 |
|---|---|---|---|---|---|---|---|---|---|---|
| 13 | {2, 4} | 1/2 | 0 | 7 | 4 | 4 | 4 | 4 | 4 | 4 |
|  |  |  | 1 | 7 | 4 | 4 | 4 | 4 | 3 | 3 |
|  |  |  | 2 | 5 | 5 | 4 | 5 | 4 | 3 | 2 |
|  |  |  | 3 | 6 | 5 | 3 | 4 | 4 | 3 | 3 |
| 13 | {2,4} | 1/4 | 0 | 3 | 3 | 2 | 2 | 2 | 2 | 2 |
|  |  |  | 1 | 4 | 2 | 2 | 2 | 2 | 2 | 2 |
|  |  |  | 2 | 3 | 3 | 2 | 3 | 2 | 2 | 1 |
|  |  |  | 3 | 4 | 2 | 2 | 3 | 2 | 2 | 1 |
| {11, 12} | {2, 4} | 1/2 | 0 | 6 | 3 | 3 | 3 | 3 | 3 | 3 |
|  |  |  | 1 | 5 | 4 | 3 | 3 | 3 | 3 | 3 |
|  |  |  | 2 | 6 | 3 | 3 | 4 | 3 | 3 | 2 |
|  |  |  | 3 | 5 | 4 | 3 | 4 | 3 | 3 | 2 |
| {11, 12} | {2, 4} | 1/4 | 0 | 3 | 2 | 2 | 2 | 2 | 2 | 2 |
|  |  |  | 1 | 2 | 2 | 2 | 2 | 2 | 1 | 1 |
|  |  |  | 2 | 3 | 2 | 2 | 2 | 2 | 2 | 2 |
|  |  |  | 3 | 2 | 2 | 2 | 2 | 2 | 1 | 1 |
| {9, 10} | {2, 4} | 1/2 | 0 | 5 | 3 | 3 | 3 | 3 | 3 | 3 |
|  |  |  | 1 | 5 | 4 | 2 | 3 | 3 | 3 | 3 |
|  |  |  | 2 | 5 | 3 | 3 | 4 | 3 | 2 | 2 |
|  |  |  | 3 | 5 | 4 | 2 | 4 | 3 | 2 | 2 |
| {9, 10} | {2, 4} | 1/4 | 0 | 3 | 2 | 2 | 2 | 2 | 2 | 2 |
|  |  |  | 1 | 2 | 2 | 2 | 2 | 2 | 1 | 1 |
|  |  |  | 2 | 3 | 2 | 2 | 2 | 2 | 2 | 2 |
|  |  |  | 3 | 2 | 2 | 2 | 2 | 2 | 1 | 1 |
| {7,8} | {2,4} | 1/2 | 0 | 3 | 3 | 2 | 2 | 2 | 2 | 2 |
|  |  |  | 1 | 4 | 2 | 2 | 2 | 2 | 2 | 2 |
|  |  |  | 2 | 3 | 3 | 2 | 3 | 2 | 2 | 1 |
|  |  |  | 3 | 4 | 2 | 2 | 3 | 2 | 2 | 1 |
| {7, 8} | {2, 4} | 1/4 | 0 | 2 | 1 | 1 | 1 | 1 | 1 | 1 |
|  |  |  | 1 | 2 | 2 | 1 | 2 | 2 | 1 | 1 |
|  |  |  | 2 | 2 | 2 | 1 | 1 | 1 | 1 | 1 |
|  |  |  | 3 | 2 | 2 | 1 | 2 | 2 | 1 | 1 |
| {5,6} | {2,4} | 1/2 | 0 | 3 | 2 | 2 | 2 | 2 | 2 | 2 |
|  |  |  | 1 | 2 | 2 | 2 | 2 | 2 | 1 | 1 |
|  |  |  | 2 | 3 | 2 | 2 | 2 | 2 | 2 | 2 |
|  |  |  | 3 | 2 | 2 | 2 | 2 | 2 | 1 | 1 |
| {5, 6} | {2, 4} | 1/4 | 0 | 2 | 1 | 1 | 1 | 1 | 1 | 1 |
|  |  |  | 1 | 2 | 1 | 1 | 2 | 2 | 1 | 1 |
|  |  |  | 2 | 2 | 2 | 1 | 1 | 1 | 1 | 1 |
|  |  |  | 3 | 2 | 2 | 1 | 2 | 2 | 1 | 1 |

TABLE 8-continued

| | | | First | $M_2$ | | $M_3$ | | | |
|---|---|---|---|---|---|---|---|---|---|
| $N_{f1}/f$ | $L_1$ | $p_1$ | index | Layer 1 | Layer 2 | Layer 1 | Layer 2 | Layer 2 | Layer 3 | Layer 1 |
| {3, 4} | {2, 4} | 1/2 | 0 | 2 | 1 | 1 | 1 | 1 | 1 | 1 |
| | | | 1 | 2 | 1 | 1 | 2 | 2 | 1 | 1 |
| | | | 2 | 2 | 2 | 1 | 1 | 1 | 1 | 1 |
| | | | 3 | 2 | 2 | 1 | 2 | 2 | 1 | 1 |
| {3,4) | {2, 4} | 1/4 | 1 | 1 | 1 | 1 | 1 | 1 | 1 | 0 |

It should be noted that the correspondence between the quantity of first frequency domain units and the ratio of first frequency-domain basis vectors, and the quantity of second frequency-domain basis vectors shown in Table 8 is a numerical relationship. It can be understood that the correspondence between the quantity of first frequency domain units and the ratio of first frequency-domain basis vectors, and the quantity of second frequency-domain basis vectors may alternatively be a proportional relationship. Table 9 shows a correspondence between the quantity of first frequency domain units, the quantity of first frequency-domain basis vectors, and the quantity of second frequency-domain basis vectors, and the ratio of the quantity of first frequency-domain basis vectors. The terminal device may search, based on the quantity of first frequency domain units, the quantity of first frequency-domain basis vectors, and the first index, for a ratio between the quantity of second frequency-domain basis vectors and the quantity of first frequency-domain basis vectors that correspond to each spatial layer when the second rank indicator value is 3 or 4; and calculate, based on the ratio and the quantity of first frequency-domain basis vectors, the quantity of second frequency-domain basis vectors corresponding to each spatial layer when the second rank indicator value is 3 or 4.

For example, Table 10 shows a correspondence between the quantity of first space-frequency combination coefficients and the quantity of second space-frequency combination coefficients. As shown in Table 10, for each quantity $K_{0,1}$ of first space-frequency combination coefficients, there are a total of four candidate value sets of quantities of second space-frequency combination coefficients. In total, each candidate value set includes one first index, one set of one or more quantities $K_{0,2}$ of second space-frequency combination coefficients when the second rank indicator value is 3, and one set of one or more quantities $K_{0,2}$ of second space-frequency combination coefficients when the second rank indicator value is 4. The set of one or more quantities $K_{0,2}$ of second space-frequency combination coefficients when the second rank indicator value is 3 includes a total of three values, which respectively correspond to three spatial layers when the second rank indicator value is 3. The set of one or more quantities $K_{0,2}$ of second space-frequency combination coefficients when the second rank indicator value is 4 includes a total of four values, which respectively correspond to four spatial layers when the second rank indicator value is 4. That is, in Table 10, one $K_{0,1}$ corresponds to a plurality of first indexes, a plurality of $K_{0,2}$, and a plurality of $K_{0,3}$. In addition, for a same $K_{0,1}$, one first index corresponds to one $K_{0,2}$ and one $K_{0,3}$.

TABLE 9

| | | | First | $p_2$ | | | $p_3$ | | | |
|---|---|---|---|---|---|---|---|---|---|---|
| $N_{f1}/f$ | $L_1$ | $p_1$ | index | Layer 1 | Layer 2 | Layer 1 | Layer 2 | Layer 2 | Layer 3 | Layer 1 |
| $N_{f1}/f$ | L | p | 0 | p | p/2 | p/2 | p/2 | p/2 | p/2 | p/2 |
| | | | 1 | p | p/2 | p/2 | p | p | p/2 | p/2 |
| | | | 2 | p | p | p/2 | p/2 | p/2 | p/2 | p/2 |
| | | | 3 | p | p | p/2 | p | p | p/2 | p/2 |
| | | | 4 | p | 2p/3 | p/3 | p/2 | p/2 | p/2 | p/2 |
| | | | 5 | p | 2p/3 | p/3 | p | p | p/2 | p/2 |
| | | | 6 | p | 2p/3 | p/3 | 2p/3 | 2p/3 | p/3 | p/3 |
| | | | 7 | p | 2p/3 | p/3 | 2p/3 | 2p/3 | p/3 | p/3 |

TABLE 10

| | First | $K_{0,2}$ | | | $K_{0,3}$ | | | |
|---|---|---|---|---|---|---|---|---|
| $K_{0,1}$ | index | Layer 1 | Layer 2 | Layer 3 | Layer 1 | Layer 2 | Layer 3 | Layer 4 |
| $K_0$ | 0 | $K_0$ | $K_0/2$ | $K_0/2$ | $K_0/2$ | $K_0/2$ | $K_0/2$ | $K_0/2$ |
| | 1 | $K_0$ | $K_0/2$ | $K_0/2$ | $K_0$ | $K_0$ | $K_0/2$ | $K_0/2$ |
| | 2 | $K_0$ | $K_0$ | $K_0/2$ | $K_0/2$ | $K_0/2$ | $K_0/2$ | $K_0/2$ |
| | 3 | $K_0$ | $K_0$ | $K_0/2$ | $K_0$ | $K_0$ | $K_0/2$ | $K_0/2$ |
| | 4 | $K_0$ | $2K_0/3$ | $K_0/3$ | $K_0/2$ | $K_0/2$ | $K_0/2$ | $K_0/2$ |
| | 5 | $K_0$ | $2K_0/3$ | $K_0/3$ | $K_0$ | $K_0$ | $K_0/2$ | $K_0/2$ |
| | 6 | $K_0$ | $2K_0/3$ | $K_0/3$ | $2K_0/3$ | $2K_0/3$ | $K_0/3$ | $K_0/3$ |
| | 7 | $K_0$ | $2K_0/3$ | $K_0/3$ | $2K_0/3$ | $2K_0/3$ | $K_0/3$ | $K_0/3$ |

For example, if the quantity of first frequency domain units is $N_f$, the ratio of first frequency-domain basis vectors is p, and the first index is 3, the found ratios between the quantities of second frequency-domain basis vectors and the quantities of first frequency-domain basis vectors that correspond to each spatial layer when the second rank indicator value is 3 or 4 are p, p, p/2, p, p, p/2, and p/2 in ascending order of numbers of the spatial layers. If it is assumed that $N_f$=4 and f=1, quantities of second frequency-domain basis vectors corresponding to three spatial layers when the second rank indicator value is 3 are 4, 4, and 2 in ascending order of numbers of the spatial layers, and quantities of second frequency-domain basis vectors corresponding to four spatial layers when the second rank indicator value is 4 are 4, 4, 2, and 2 in ascending order of numbers of the spatial layers.

In this embodiment, the terminal device may find, from Table 10 based on one $K_{0,1}$, four candidate value sets of quantities of second space-frequency combination coefficients, where the four candidate value sets correspond to the $K_{0,1}$ and each include $K_{0,2}$ and $K_{0,3}$. Then, the terminal device may traverse the four candidate value sets for channel sounding; and select, based on a sounding result, a second rank indicator value optimally adapted to a current channel status, a quantity of spatial layers that corresponds to the second rank indicator value, and a quantity of second space-frequency combination coefficients of each spatial layer. For example, $K_{0,1}=K_0$. If it is assumed that a channel sounding result with the first index being 1 and the second rank indicator value being 4 is optimal, it is determined that the first index that needs to be reported is 1, the second rank indicator value is 4, and four quantities $K_{0,3}$ of second space-frequency combination coefficients corresponding to four spatial layers are $K_0$, $K_0$, $K_0/2$, and $K_0/2$ in ascending order of numbers of the spatial layers. For another example, $K_{0,1}=K_0$. If it is assumed that a channel sounding result with the first index being 2 and the second rank indicator value being 3 is optimal, it is determined that the first index that needs to be reported is 2, the second rank indicator value is 3, and three quantities $K_{0,2}$ of second space-frequency combination coefficients corresponding to three spatial layers are $K_0$, $K_0$, and $K_0/2$ in ascending order of numbers of the spatial layers.

For example, Table 11 shows a correspondence between the ratio of first space-frequency combination coefficients and the ratio of second space-frequency combination coefficients. As shown in Table 11, for each ratio $\beta_1$ of first space-frequency combination coefficients, there are a total of four candidate value sets of ratios of second space-frequency combination coefficients. In total, each candidate value set includes one first index, one ratioset of one or more ratios $\beta_2$ of second space-frequency combination coefficients when the second rank indicator value is 3, and one ratioset of one or more ratios $\beta_3$ of second space-frequency combination coefficients when the second rank indicator value is 4. The ratioset of one or more ratios $\beta_2$ of second space-frequency combination coefficients when the second rank indicator value is 3 includes a total of three values, which respectively correspond to three spatial layers when the second rank indicator value is 3. The ratioset of one or more ratios $\beta_3$ of second space-frequency combination coefficients when the second rank indicator value is 4 includes a total of four values, which respectively correspond to four spatial layers when the second rank indicator value is 4. That is, in Table 10, one $\beta_1$ corresponds to a plurality of first indexes, a plurality of $\beta_2$, and a plurality of $\beta_3$. In addition, for a same $\beta_1$, one first index corresponds to one $\beta_2$ and one $\beta_3$.

In this embodiment, the terminal device may find, from Table 10 based on one $\beta_1$, four candidate value sets of ratios of second space-frequency combination coefficients, where the four candidate value sets correspond to the $\beta_1$ and each include $\beta_2$ and $\beta_3$. Then, the terminal device may traverse the four candidate value sets for channel sounding; and select, based on a sounding result, a second rank indicator value optimally adapted to a current channel status, a quantity of spatial layers that corresponds to the second rank indicator value, and a ratio of second space-frequency combination coefficients of each spatial layer. For example, $\beta_1=\beta$. If it is assumed that a channel sounding result with the first index being 1 and the second rank indicator value being 4 is optimal, it is determined that the first index that needs to be reported is 1, the second rank indicator value is 4, and four ratios $\beta_3$ of second space-frequency combination coefficients corresponding to four spatial layers are $\beta$, $\beta$, $\beta/2$, and $\beta/2$ in ascending order of numbers of the spatial layers. For another example, $\beta_1=\beta$. If it is assumed that a channel sounding result with the first index being 2 and the second rank indicator value being 3 is optimal, it is determined that the first index that needs to be reported is 2, the second rank indicator value is 3, and three ratios $\beta_2$ of second space-frequency combination coefficients corresponding to three spatial layers are $\beta$, $\beta$, and $\beta/2$ in ascending order of numbers of the spatial layers.

It should be noted that in a channel sounding process, the quantity $K_0$ of space-frequency combination coefficients needs to be calculated based on the quantity L of spatial-domain basis vectors, the quantity M of frequency-domain basis vectors, and the ratio $\beta$ of space-frequency combination coefficients. For example, a quantity of space-frequency combination coefficients may be calculated based on the following formula:

$K_0 = \lceil 2 \times \beta \times L \times M \rceil$, where 2 represents two polarization directions, and values of $K_0$, L, M, and $\beta$ may be $K_{0,1}$, $L_1$, $M_1$, and $\beta_1$, may be $K_{0,2}$, $L_2$, $M_2$, and $\beta_2$, or may be $K_{0,3}$, $L_3$, $M_3$, and $\beta_3$.

TABLE 11

| $\beta_1$ | First index | $\beta_2$ Layer 1 | $\beta_2$ Layer 2 | $\beta_2$ Layer 3 | $\beta_3$ Layer 1 | $\beta_3$ Layer 2 | $\beta_3$ Layer 3 | $\beta_3$ Layer 4 |
|---|---|---|---|---|---|---|---|---|
| $\beta$ | 0 | $\beta$ | $\beta/2$ | $\beta/2$ | $\beta/2$ | $\beta/2$ | $\beta/2$ | $\beta/2$ |
|  | 1 | $\beta$ | $\beta/2$ | $\beta/2$ | $\beta$ | $\beta$ | $\beta/2$ | $\beta/2$ |
|  | 2 | $\beta$ | $\beta$ | $\beta/2$ | $\beta/2$ | $\beta/2$ | $\beta/2$ | $\beta/2$ |
|  | 3 | $\beta$ | $\beta$ | $\beta/2$ | $\beta$ | $\beta$ | $\beta/2$ | $\beta/2$ |
|  | 4 | $\beta$ | $2\beta/3$ | $\beta/3$ | $\beta/2$ | $\beta/2$ | $\beta/2$ | $\beta/2$ |
|  | 5 | $\beta$ | $2\beta/3$ | $\beta/3$ | $\beta$ | $\beta$ | $\beta/2$ | $\beta/2$ |
|  | 6 | $\beta$ | $2\beta/3$ | $\beta/3$ | $2\beta/3$ | $2\beta/3$ | $\beta/3$ | $\beta/3$ |
|  | 7 | $\beta$ | $2\beta/3$ | $\beta/3$ | $2\beta/3$ | $2\beta/3$ | $\beta/3$ | $\beta/3$ |

For example, Table 12 shows a correspondence between the first spatial-domain basis vector and the ratio of first space-frequency combination coefficients, and the quantity of second spatial-domain basis vectors and the quantity of second space-frequency combination coefficients. As shown in Table 12, one first parameter set $\{L_1, p_1\}$ including the quantity $L_1$ of first spatial-domain basis vectors and the ratio $p_1$ of first space-frequency combination coefficients has a total of four candidate value sets of quantities of second spatial-domain basis vectors and quantities of second space-frequency combination coefficients. In total, each candidate value set includes one first index, one candidate value subset $\{L_2, p_2\}$ of the quantity $L_2$ of second spatial-domain basis vectors and the ratio relationship $p_2$ of second space-frequency combination coefficients when the second rank indicator value is 3, and one candidate value subset $\{L_3, p_3\}$ of the quantity $L_3$ of second spatial-domain basis vectors and the ratio relationship $p_3$ of second space-frequency combination coefficients when the second rank indicator value is 4. The candidate value subset $\{L_2, p_2\}$ of the quantity $L_2$ of second spatial-domain basis vectors and the ratio relationship $p_2$ of second space-frequency combination coefficients when the second rank indicator value is 3 includes a total of three groups of values, which respectively correspond to three spatial layers when the second rank indicator value is 3. The candidate value subset $\{L_3, p_3\}$ of the quantity $L_3$ of second spatial-domain basis vectors and the ratio relationship $p_3$ of second space-frequency combination coefficients when the second rank indicator value is 4 includes a total of four groups of values, which respectively correspond to four spatial layers when the second rank indicator value is 4. That is, in Table 12, one group of $\{L_1, p_1\}$ corresponds to a plurality of first indexes, a plurality of groups of $\{L_2, p_2\}$, and a plurality of groups of $\{L_3, p_3\}$. In addition, for a same group of $\{L_1, p_1\}$, one first index corresponds to one group of $\{L_2, p_2\}$ and one group of $\{L_3, p_3\}$.

In this embodiment, the terminal device may find, from Table 12 based on one group of $\{L_1, p_1\}$, four candidate value sets that correspond to this group of $\{L_1, p_1\}$ and each of which includes $\{L_2, p_2\}$ and $\{L_3, p_3\}$. Then, the terminal device may traverse the four candidate value sets for channel sounding; and select, based on a sounding result, a second rank indicator value optimally adapted to a current channel status, a quantity of spatial layers that corresponds to the second rank indicator value, and the quantity of second spatial-domain basis vectors and the ratio relationship of second space-frequency combination coefficients of each spatial layer.

For example, $\{L_1=L, p_1=p\}$. If it is assumed that a channel sounding result with the first index being 5 and the second rank indicator value being 4 is optimal, it is determined that the first index that needs to be reported is 5, the second rank indicator value is 4, and four groups of $\{L_3, p_3\}$ corresponding to four spatial layers are $\{L, p/2\}$, $\{L, p/2\}$, $\{L/2, p\}$, and $\{L/2, p\}$ in ascending order of numbers of the spatial layers. For another example, $\{L_1=L, p_1=p\}$. If it is assumed that a channel sounding result with the first index being 7 and the second rank indicator value being 4 is optimal, it is determined that the first index that needs to be reported is 7, the second rank indicator value is 3, and three groups of $\{L_2, p_2\}$ corresponding to three spatial layers are $\{L, p\}$, $\{L/2, p\}$, and $\{L, p/2\}$ in ascending order of numbers of the spatial layers.

TABLE 12

| | | | $L_2, p_2$ | | $L_3, p_3$ | | | |
|---|---|---|---|---|---|---|---|---|
| $L_1$ | $p_1$ | First index | Layer 1 | Layer 2 | Layer 1 | Layer 2 | Layer 2 | Layer 3 | Layer 1 |
| L | p | 0 | L, p | L, p/2 | L, p/2 | L, p/2 | L, p/2 | L, p/2 | L, p/2 |
| | | 1 | L, p | L/2, p | L/2, p | L, p/2 | L, p/2 | L, p/2 | L, p/2 |
| | | 2 | L, p | L, p/2 | L/2, p | L, p/2 | L, p/2 | L, p/2 | L, p/2 |
| | | 3 | L, p | L/2, p | L, p/2 | L, p/2 | L, p/2 | L, p/2 | L, p/2 |
| | | 4 | L, p | L, p/2 | L, p/2 | L, p/2 | L, p/2 | L/2, p | L/2, p |
| | | 5 | L, p | L/2, p | L/2, p | L, p/2 | L, p/2 | L/2, p | L/2, p |
| | | 6 | L, p | L, p/2 | L/2, p | L, p/2 | L, p/2 | L/2, p | L/2, p |
| | | 7 | L, p | L/2, p | L, p/2 | L, p/2 | L, p/2 | L/2, p | L/2, p |

For example, Table 13 shows a correspondence between the quantity of first spatial-domain basis vectors and the ratio of first frequency-domain basis vectors, and the quantity of second spatial-domain basis vectors and the ratio of second frequency-domain basis vectors. As shown in Table 13, one first parameter set $\{L_1, \beta_1\}$ including the quantity $L_1$ of first spatial-domain basis vectors and the ratio $\beta_1$ of first frequency-domain basis vectors has a total of four candidate value sets of quantities of second spatial-domain basis vectors and ratios of second frequency-domain basis vectors. In total, each candidate value set includes one first index, one candidate value subset $\{L_2, \beta_2\}$ of the quantity $L_2$ of second spatial-domain basis vectors and the ratio relationship $\beta_2$ of second frequency-domain basis vectors when the second rank indicator value is 3, and one candidate value subset $\{L_3, \beta_3\}$ of the quantity $L_3$ of second spatial-domain basis vectors and the ratio relationship $\beta_3$ of second frequency-domain basis vectors when the second rank indicator value is 4. The candidate value subset $\{L_2, \beta_2\}$ of the quantity $L_2$ of second spatial-domain basis vectors and the ratio relationship $\beta_2$ of second frequency-domain basis vectors when the second rank indicator value is 3 includes a total of three groups of values, which respectively correspond to three spatial layers when the second rank indicator value is 3. The candidate value subset $\{L_3, \beta_3\}$ of the quantity $L_3$ of second spatial-domain basis vectors and the ratio relationship $\beta_3$ of second frequency-domain basis vectors when the second rank indicator value is 4 includes a total of four groups of values, which respectively correspond to four spatial layers when the second rank indicator value is 4. That is, in Table 13, one group of $\{L_1, \beta_1\}$ corresponds to a plurality of first indexes, a plurality of groups of $\{L_2, \beta_2\}$, and a plurality of groups of $\{L_3, \beta_3\}$. In addition, for a same group of $\{L_1, \beta_1\}$, one first index corresponds to one group of $\{L_2, \beta_2\}$ and one group of $\{L_3, \beta_3\}$.

In this embodiment, the terminal device may find, from Table 13 based on one group of $\{L_1, \beta_1\}$, four candidate value sets that correspond to this group of $\{L_1, \beta_1\}$ and each of which includes $\{L_2, \beta_2\}$ and $\{L_3, \beta_3\}$. Then, the terminal device may traverse the four candidate value sets for channel sounding; and select, based on a sounding result, a second rank indicator value optimally adapted to a current channel status, a quantity of spatial layers that corresponds to the second rank indicator value, and the quantity of second spatial-domain basis vectors and the ratio relationship of second frequency-domain basis vectors of each spatial layer.

For example, $\{L_1=L, \beta_1=\beta\}$. If it is assumed that a channel sounding result with the first index being 5 and the second rank indicator value being 4 is optimal, it is determined that the first index that needs to be reported is 5, the second rank indicator value is 4, and four groups of $\{L_3, \beta_3\}$ corresponding to four spatial layers are $\{L, \beta/2\}$, $\{L, \beta/2\}$, $\{L/2, \beta\}$, and $\{L/2, \beta\}$ in ascending order of numbers of the spatial layers. For another example, $\{L_1=L, \beta_1=\beta\}$. If it is assumed that a channel sounding result with the first index being 7 and the second rank indicator value being 3 is optimal, it is determined that the first index that needs to be reported is 7, the second rank indicator value is 3, and three groups of $\{L_2, \beta_2\}$ corresponding to three spatial layers are $\{L, \beta\}$, $\{L/2, \beta\}$, and $\{L, \beta/2\}$ in ascending order of numbers of the spatial layers.

TABLE 13

| | | | $L_2, \beta_2$ | | $L_3, \beta_3$ | | | |
|---|---|---|---|---|---|---|---|---|
| $L_1$ | $\beta_1$ | First index | Layer 1 | Layer 2 | Layer 1 | Layer 2 | Layer 2 | Layer 3 | Layer 1 |
| L | β | 0 | L, β | L, β/2 | L, β/2 | L, β/2 | L, β/2 | L, β/2 | L, β/2 |
| | | 1 | L, β | L/2, β | L/2, β | L, β/2 | L, β/2 | L, β/2 | L, β/2 |
| | | 2 | L, β | L, β/2 | L/2, β | L, β/2 | L, β/2 | L, β/2 | L, β/2 |
| | | 3 | L, β | L/2, β | L, β/2 | L, β/2 | L, β/2 | L, β/2 | L, β/2 |
| | | 4 | L, β | L, β/2 | L, β/2 | L, β/2 | L, β/2 | L/2, β | L/2, β |
| | | 5 | L, β | L/2, β | L/2, β | L, β/2 | L, β/2 | L/2, β | L/2, β |
| | | 6 | L, β | L, β/2 | L/2, β | L, β/2 | L, β/2 | L/2, β | L/2, β |
| | | 7 | L, β | L/2, β | L, β/2 | L, β/2 | L, β/2 | L/2, β | L/2, β |

Table 1 and Table 13 are merely several examples of the first correspondence. In actual application, instances of the first correspondence in another form may also be used, and are not enumerated herein one by one.

It should be noted that, in any one of the first correspondences, one or one group of first parameters may correspond to one or more candidate values of one or more or one or more groups of second parameters. In actual application, the first correspondence may be stored in the terminal device in a manner of presetting a configuration table or a configuration pattern. The terminal device may search, based on the first parameter, for one or more candidate values of one or more or one or more groups of second parameters corresponding to the first parameter; then, perform a measurement task such as channel status measurement in a manner of traversing all the candidate values; and determine, based on a measurement result, a second parameter that needs to be reported to the network device and indication information that corresponds to the second parameter and that is used to determine the second precoding matrix, so that the network device generates the second precoding matrix. For example, a second parameter with an optimal channel status and the indication information of the second precoding matrix may be selected from the foregoing traversing measurement results.

Further, to reduce reporting overheads of the terminal device, the terminal device may alternatively not report the second parameter, but to report only the first index. Further, in this case, the network device also needs to store the first correspondence locally. After receiving the first index reported by the terminal device, the network device may determine the second parameter based on the first index and the first parameter that is previously delivered to the terminal device; and then, generate the second precoding matrix based on the second parameter and the indication information that is of the second precoding matrix and that is reported by the terminal device. Therefore, optionally, the communication method may further include the following step.

Step 3: The terminal device sends the first index to the network device. The first index is an index value determined based on the first parameter and the first correspondence. For a same first parameter (or a same group of first parameters), one first index corresponds to one second parameter.

Similarly, to reduce resource overheads for configuring the second parameter by the network device or in a case in which the network device only needs indication information that is of the second precoding matrix and that corresponds to some of a plurality of (groups of) candidate values of the second parameter specified by the terminal device, the network device may also send, to the terminal device, first indexes corresponding to some candidate values of the second parameter, for example, configure only one first index. Therefore, optionally, the communication method may further include the following step.

Step 4: The terminal device receives the first index from the network device. The first index is used to determine the second parameter based on the first parameter and the first correspondence.

It should be noted that when the network device configures one first index, the terminal device does not need to report the configured first index when reporting the indication information of the second precoding matrix.

However, when the network device configures a plurality of first indexes, the terminal device also needs to report a first index corresponding to the indication information of the second precoding matrix when reporting the indication information of the second precoding matrix. It can be understood that the terminal device needs to traverse a plurality of first indexes to perform a channel sounding task. Subsequently, the terminal device may perform one of the following:

selecting, based on the channel sounding task, a first index, the indication information of the second precoding matrix, and a rank indicator value that are optimally adapted to a current channel status, and reporting the first index, the indication information of the second precoding matrix, and a rank indicator value to the network device; and determining, based on the channel sounding task, a rank indicator value and indication information of the second precoding matrix that corresponds to each first index, and reporting the indication information of the second precoding matrix and the rank indicator value to the network device.

In another possible method, that the terminal device determines the second parameter and indication information of a second precoding matrix based on the first parameter in S302 may include the following step.

Step 5: The terminal device calculates a converted value of the second parameter based on the first parameter and a preset conversion rule.

For example, the preset conversion rule may include one or more of the following formulas:

$$\overline{L} = \left\lceil \frac{2}{R} \times L \right\rceil, \overline{M} = \left\lceil \frac{2}{R} \times M \right\rceil, \text{ and } \overline{K_0} = \left\lceil \frac{2}{R} \times K_0 \right\rceil,$$

where

L is a quantity of first spatial-domain basis vectors, $\overline{L}$ is a converted value of a quantity of second spatial-domain basis vectors, M is a quantity of first frequency-domain basis vectors, $\overline{M}$ is a converted value of a quantity of second frequency-domain basis vectors, $K_0$ is a quantity of first space-frequency combination coefficients, $\overline{K_0}$ is a converted value of a quantity of second space-frequency combination coefficients, R is a candidate value of a rank indicator value corresponding to the second parameter, R is a positive integer, and R>2.

For example, the quantity of frequency domain units satisfies $N_f$=13, and a frequency domain length of each frequency domain unit is the same as that of one frequency domain subband, that is, f=1. If a ratio of frequency-domain basis vectors satisfies p=½, each spatial-domain basis vector at each spatial layer corresponds to a same quantity M of frequency-domain basis vector when the rank indicator value is 1 or 2, where M=7. If each spatial layer corresponds to a different quantity of frequency-domain basis vectors when the rank indicator value is 3 or 4, a converted value of the quantity of frequency-domain basis vectors is $$\overline{M} = \left\lceil \frac{2}{R} \times M \right\rceil = 5$$

when the rank indicator value is 3, and a converted value of an average quantity of frequency-domain basis vectors is $$\overline{M} = \left\lceil \frac{2}{R} \times M \right\rceil = 4$$

when the rank indicator value is 4.

Further, optionally, that the terminal device determines the second parameter and indication information of a second precoding matrix based on the first parameter in S302 may further include the following step.

Step 6: The terminal device directly uses the converted value of the second parameter as the second parameter.

Optionally, that the terminal device determines the second parameter and indication information of a second precoding matrix based on the first parameter in S302 may further include the following step.

Step 7: The terminal device uses a sum of an offset value of the second parameter and the converted value of the second parameter as the second parameter.

One offset value of the second parameter corresponds to one second index. The offset value is usually a relatively small value, and may be positive, negative, or 0. Similar to the first correspondence, the one-to-one correspondence (which is briefly referred to as a second correspondence below) between the offset value of the second parameter and the second index may also be stored in the terminal device and the network device in a manner of pre-configuring a table or a correspondence pattern.

For example, Table 14 is an example of the second correspondence. As shown in Table 14, four second indexes 0, 1, 2, and 3 sequentially correspond to four offset values of the second parameter: 1, 0, −1, and −2. Correspondingly, the preset conversion rule may include one or more of the following formulas:

$$L_i = \left\lceil \frac{2}{R_i} \times L_1 \right\rceil + \alpha, \; M_i = \left\lceil \frac{2}{R_i} \times M_1 \right\rceil + \delta, \text{ and } K_{0,i} = \left\lceil \frac{2}{R_i} \times K_{0,1} \right\rceil + \lambda,$$

where $L_1$ is the quantity of first spatial-domain basis vectors, $L_i$ is the quantity of second spatial-domain basis vectors, $M_1$ is the quantity of first frequency-domain basis vectors, $M_i$ is the quantity of second frequency-domain basis vectors, $K_{0,1}$ is the quantity of first space-frequency combination coefficients, $K_{0,i}$ is a converted value of the quantity of second space-frequency combination coefficients, $R_i$ is a rank indicator value corresponding to the second parameter, $R_i$ is a positive integer and $R_i > 2$, a value of i is 2 or 3, and $R_i$, $\alpha$, $\delta$, and $\lambda$ are sequentially offset values of $L_i$, $M_i$, and $K_{0,i}$.

For example, the quantity of frequency domain units satisfies $N_f = 13$, and a frequency domain length of each frequency domain unit is the same as that of one frequency domain subband, that is, f=1. If a ratio of frequency-domain basis vectors satisfies p=½, each spatial-domain basis vector at each spatial layer corresponds to a same quantity M of frequency-domain basis vector when the rank indicator value is 1 or 2, where M=7. If each spatial layer corresponds to a different quantity of frequency-domain basis vectors when the rank indicator value is 3 or 4, and it is assumed that δ is 1, the quantity of frequency-domain basis vectors is 6 when the rank indicator value is 3, and a converted value of an average quantity of frequency-domain basis vectors is 5 when the rank indicator value is 4.

TABLE 14

| Second index | Offset value |
|---|---|
| 0 | +1 |
| 1 | 0 |
| 2 | −1 |
| 3 | −2 |

It can be understood that the offset value of the second parameter may be directly delivered by the network device to the terminal device. Optionally, to further reduce the configuration overheads, the network device may alternatively deliver the second index to the terminal device; and then, the terminal device automatically determines the offset value of the second parameter based on the locally stored second correspondence. Therefore, optionally, before S302 in which the terminal device determines the second parameter and the indication information of the second precoding matrix based on the first parameter, the communication method may further include the following step.

Step 8: The terminal device receives the second index or the offset value of the second parameter from the network device. One second index corresponds to one offset value of the second parameter.

For example, the network device may deliver the second index in a form of a bitmap. For example, higher layer signaling used by the network device to indicate the quantity of frequency-domain basis vectors corresponding to each spatial layer when rank indicator values are 3 and 4 includes a total of seven fields, which are respectively used to indicate the quantity of frequency-domain basis vectors corresponding to each spatial layer when the rank indicator value is 3 and the quantity of frequency-domain basis vectors corresponding to each spatial layer when the rank indicator value is 4. Based on Table 11, each field includes two bits, which are used to indicate one second index in Table 3, and each second index corresponds to one offset value of an optional quantity of frequency-domain basis vectors relative to the quantity of frequency-domain basis vectors. For example, if the higher layer signaling is 00011101011010, it indicates that offsets of quantities of frequency-domain basis vectors corresponding to spatial layers 1 to 3 relative to a converted value of the quantity of frequency-domain basis vectors are sequentially 1, 0, −2 when the rank indicator value is 3. Similarly, when the rank indicator value is 3, it indicates that the quantity of frequency-domain basis vectors corresponding to the spatial layer 2 is 5 and the quantity of frequency-domain basis vectors corresponding to the spatial layer 3 is 3. When the rank indicator value is 4, it indicates that quantities of frequency-domain basis vectors corresponding to spatial layers 1 to 4 are respectively 4, 4, 3, and 3.

Additionally, the network device may alternatively not deliver the offset value of the second parameter and the second index. In this case, the terminal device may determine the offset value of the second parameter and a candidate value of the second index based on the locally stored second correspondence, perform a measurement task such as channel status measurement in a manner of traversing all candidate values, and determine the offset value of the second parameter and the second index that need to be reported. Therefore, optionally, the communication method may further include the following step.

Step 9: The terminal device sends the second index or the offset value of the second parameter to the network device. One second index corresponds to one offset value of the second parameter.

It should be noted that the first parameter corresponds to a first rank indicator value, the second parameter corresponds to a second rank indicator value, and the second rank indicator value is greater than the first rank indicator value. The terminal device determines, from the first rank indicator value and the second rank indicator value based on a channel status measurement result, an optimal rank indicator value that needs to be reported, so that the network device generates a precoding matrix best matching a current channel status. Therefore, optionally, the communication method may further include the following step.

Step 10: The terminal device sends the second rank indicator value to the network device.

S303: The terminal device sends the indication information of the second precoding matrix to the network device. Correspondingly, the network device receives the indication information of the second precoding matrix from the terminal device.

For example, the terminal device may report the indication information of the second precoding matrix on an uplink by using a channel status indication report, a measurement report, and the like. It can be understood that, in addition to the indication information of the second precoding matrix, the terminal device further needs to report one or more of the following parameters: the first rank indicator value or the second rank indicator value, the first index or the second parameter, and the second index or the offset value of the second parameter. For a specific determining method thereof, refer to the related description in S302. Details are not described herein again.

According to the communication method provided in this embodiment, the terminal device may determine the second parameter based on the first parameter configured by a base station; and determine, based on the second parameter, the indication information used to generate the second precoding matrix. In this way, an existing configuration procedure of the first parameter is not affected, configuration complexity of configuring the second parameter can be reduced, and configuration overheads of the second parameter are reduced, thereby improving work efficiency of a wireless communications system.

The communication method in this embodiment is described above in detail with reference to FIG. 3. A communications apparatus that can perform the communication method in the method embodiment is described below with reference to FIG. 4 and FIG. 5.

Figure 4:
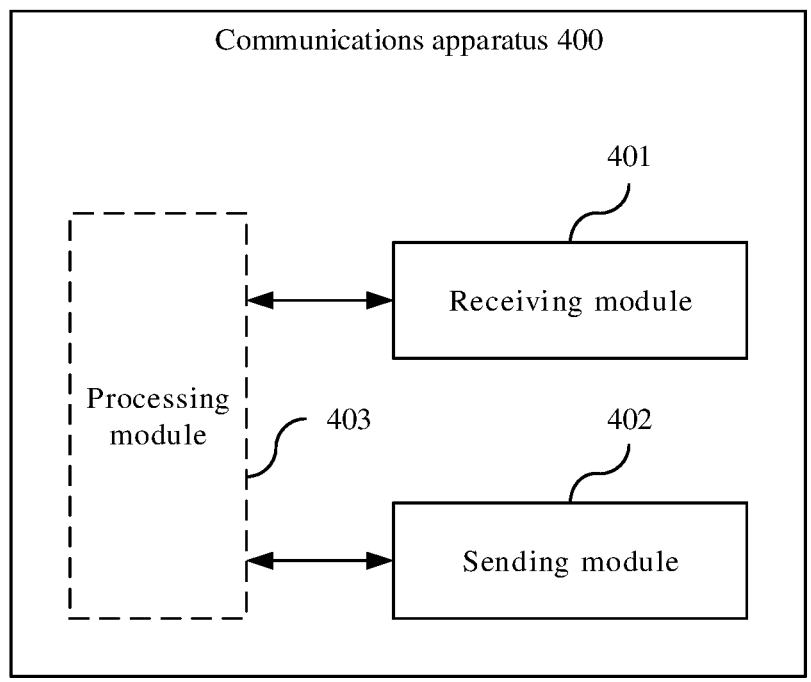
FIG. 4 is a schematic structural diagram of a communications apparatus according to an embodiment.

An embodiment provides a communications apparatus. The communications apparatus may be applied to the terminal device shown in FIG. 1, and is configured to perform functions of the terminal device in the communications method shown in FIG. 3. As shown in FIG. 4, the communications apparatus 400 includes a receiving module 401 and a sending module 402.

The receiving module 401 is configured to receive a first parameter from a network device. The first parameter is used to determine indication information of a first precoding matrix and a second parameter, and the second parameter is used to determine indication information of a second precoding matrix.

The sending module 402 is configured to send the indication information of the second precoding matrix to the network device.

For example, the first parameter includes one or more of the following parameters: a quantity of first frequency domain units, a quantity of first spatial-domain basis vectors, a quantity or a ratio of first frequency-domain basis vectors, and a quantity or a ratio of first space-frequency combination coefficients. Correspondingly, the second parameter includes one or more of the following parameters: a quantity of second frequency domain units, a quantity of second spatial-domain basis vectors, a quantity or a ratio of second frequency-domain basis vectors, and a quantity or a ratio of second space-frequency combination coefficients.

In a possible implementation, that the first parameter is used to determine a second parameter may include: determining the second parameter based on a first correspondence. The first correspondence includes one or more of the following correspondences: a correspondence between a quantity of first spatial-domain basis vectors and a quantity of second spatial-domain basis vectors; a correspondence between a quantity of first frequency-domain basis vectors and a quantity of second frequency-domain basis vectors; a correspondence between a ratio of first frequency-domain basis vectors and a ratio of second frequency-domain basis vectors; a correspondence between a quantity of first frequency domain units and a ratio of first frequency-domain basis vectors, and a quantity of second frequency-domain basis vectors; a correspondence between a quantity of first space-frequency combination coefficients and a quantity of second space-frequency combination coefficients; a correspondence between a ratio of first space-frequency combination coefficients and a ratio of second space-frequency combination coefficients; a correspondence between a quantity of first spatial-domain basis vectors, a quantity of first frequency-domain basis vectors, and a ratio of first space-frequency combination coefficients, and a quantity of second space-frequency combination coefficients; a correspondence between a quantity of first spatial-domain basis vectors and a quantity of first frequency-domain basis vectors, and a quantity of second spatial-domain basis vectors and a quantity of second frequency-domain basis vectors; a correspondence between a quantity of first spatial-domain basis vectors and a ratio of first frequency-domain basis vectors, and a quantity of second spatial-domain basis vectors and a ratio of second frequency-domain basis vectors; a correspondence between a quantity of first spatial-domain basis vectors and a quantity of first space-frequency combination coefficients, and a quantity of second spatial-domain basis vectors and a quantity of second space-frequency combination coefficients; and a correspondence between a quantity of first spatial-domain basis vectors and a ratio of first space-frequency combination coefficients, and a quantity of second spatial-domain basis vectors and a ratio of second space-frequency combination coefficients.

Optionally, the sending module 402 is further configured to send a first index to the network device. The first index is an index value determined based on the first parameter and the first correspondence, and one first index corresponds to one second parameter.

Optionally, the receiving module 401 is further configured to receive the first index from the network device. The first index is used to determine the second parameter based on the first parameter and the first correspondence.

In another possible implementation, that the first parameter is used to determine a second parameter may include: calculating a converted value of the second parameter based on the first parameter and a preset conversion rule.

For example, the preset conversion rule includes one or more of the following formulas:

$$\overline{L} = \left\lceil \frac{2}{R} \times L \right\rceil, \overline{M} = \left\lceil \frac{2}{R} \times M \right\rceil, \text{ and } \overline{K_0} = \left\lceil \frac{2}{R} \times K_0 \right\rceil,$$

where L is a quantity of first spatial-domain basis vectors, $\overline{L}$ is a converted value of a quantity of second spatial-domain basis vectors, M is a quantity of first frequency-domain basis vectors, $\overline{M}$ is a converted value of a quantity of second frequency-domain basis vectors, $K_0$ is a quantity of first space-frequency combination coefficients, $\overline{K_0}$ is a converted value of a quantity of second space-frequency combination coefficients, R is a candidate value of a rank indicator value corresponding to the second parameter, and R>2.

Further, optionally, that the first parameter is used to determine a second parameter may further include: using the converted value of the second parameter as the second parameter.

Further, optionally, that the first parameter is used to determine a second parameter may further include: using a sum of an offset value of the second parameter and the converted value of the second parameter as the second parameter.

Alternatively, optionally, that the first parameter is used to determine a second parameter may further include: The sending module 402 is further configured to send a second index or the offset value of the second parameter to the network device. One second index corresponds to one offset value of the second parameter.

Optionally, the receiving module 401 is further configured to receive a second index or the offset value of the second parameter from the network device, where one second index corresponds to one offset value of the second parameter.

It should be noted that the first parameter corresponds to a first rank indicator value, the second parameter corresponds to a second rank indicator value, and the second rank indicator value is greater than the first rank indicator value.

Optionally, the sending module 402 is further configured to send the second rank indicator value to the network device.

Optionally, as shown in FIG. 4, the communications apparatus 400 may further include a processing module 403. The processing module 403 is configured to: control the receiving module 401 and the sending module 402 of the communications apparatus 400 to perform functions, and perform an internal processing procedure, for example, determine the second parameter based on the first parameter, and determine the indication information of the second precoding matrix based on the second parameter.

In addition, the communications apparatus 400 may further include a storage module (not shown in FIG. 4). The storage module is configured to store a control program or instructions of the communications apparatus 400. The control program or the instructions may be read and executed by the processor 403, so that the communications apparatus 400 performs functions performed by the terminal device in the communications method shown in FIG. 3.

It should be noted that the communications apparatus 400 may be a terminal device, or may be a chip or chip system disposed in the terminal device. This is not limited in the embodiments.

Figure 5:
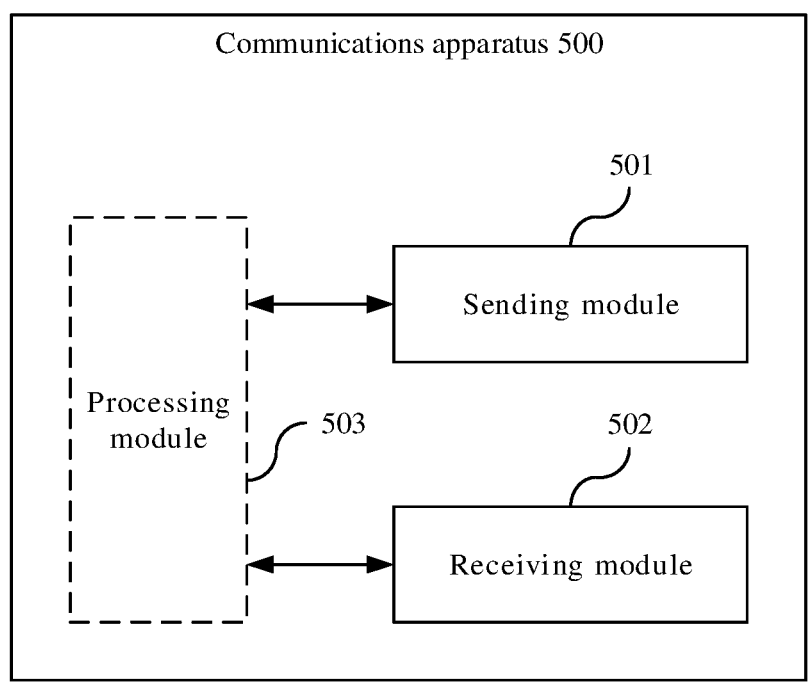
FIG. 5 is a schematic structural diagram of another communications apparatus according to an embodiment.

An embodiment provides a communications apparatus 500. The communications apparatus 500 may be applied to the network device shown in FIG. 1, and is configured to perform functions of the network device in the communications method shown in FIG. 3. As shown in FIG. 5, the communications apparatus 500 includes a sending module 501 and a receiving module 502.

The sending module 501 is configured to send a first parameter to a terminal device. The first parameter is used by the terminal device to determine indication information of a first precoding matrix and a second parameter, and the second parameter is used to determine indication information of a second precoding matrix. The receiving module 502 is configured to receive the indication information of the second precoding matrix from the terminal device.

For example, the first parameter includes one or more of the following parameters: a quantity of first frequency domain units, a quantity of first spatial-domain basis vectors, a quantity or a ratio of first frequency-domain basis vectors, and a quantity or a ratio of first space-frequency combination coefficients. Correspondingly, the second parameter includes one or more of the following parameters: a quantity of second frequency domain units, a quantity of second spatial-domain basis vectors, a quantity or a ratio of second frequency-domain basis vectors, and a quantity or a ratio of second space-frequency combination coefficients.

In a possible implementation, that the first parameter is used to determine a second parameter may include: determining the second parameter based on a first correspondence. The first correspondence includes one or more of the following correspondences: a correspondence between a quantity of first spatial-domain basis vectors and a quantity of second spatial-domain basis vectors; a correspondence between a quantity of first frequency-domain basis vectors and a quantity of second frequency-domain basis vectors; a correspondence between a ratio of first frequency-domain basis vectors and a ratio of second frequency-domain basis vectors; a correspondence between a quantity of first frequency domain units and a ratio of first frequency-domain basis vectors, and a quantity of second frequency-domain basis vectors; a correspondence between a quantity of first space-frequency combination coefficients and a quantity of second space-frequency combination coefficients; a correspondence between a ratio of first space-frequency combination coefficients and a ratio of second space-frequency combination coefficients; a correspondence between a quantity of first spatial-domain basis vectors, a quantity of first frequency-domain basis vectors, and a ratio of first space-frequency combination coefficients, and a quantity of second space-frequency combination coefficients; a correspondence between a quantity of first spatial-domain basis vectors and a quantity of first frequency-domain basis vectors, and a quantity of second spatial-domain basis vectors and a quantity of second frequency-domain basis vectors; a correspondence between a quantity of first spatial-domain basis vectors and a ratio of first frequency-domain basis vectors, and a quantity of second spatial-domain basis vectors and a ratio of second frequency-domain basis vectors; a correspondence between a quantity of first spatial-domain basis vectors and a quantity of first space-frequency combination coefficients, and a quantity of second spatial-domain basis vectors and a quantity of second space-frequency combination coefficients; and a correspondence between a quantity of first spatial-domain basis vectors and a ratio of first space-frequency combination coefficients, and a quantity of second spatial-domain basis vectors and a ratio of second space-frequency combination coefficients.

Optionally, the receiving module 502 is further configured to receive a first index from the terminal device, where the second index is used to determine the second parameter based on the first parameter and the first correspondence.

Optionally, the sending module 501 is further configured to send a first index to the terminal device, where the first index is an index value determined based on the first parameter and the first correspondence, and one first index corresponds to one second parameter.

In another possible implementation, that the first parameter is used to determine a second parameter may include: calculating a converted value of the second parameter based on the first parameter and a preset conversion rule.

For example, the preset conversion rule may include one or more of the following formulas:

$$\overline{L} = \left\lceil \frac{2}{R} \times L \right\rceil, \overline{M} = \left\lceil \frac{2}{R} \times M \right\rceil, \text{ and } \overline{K_0} = \left\lceil \frac{2}{R} \times K_0 \right\rceil,$$

where L is a quantity of first spatial-domain basis vectors, $\overline{L}$ is a converted value of a quantity of second spatial-domain basis vectors, M is a quantity of first frequency-domain basis vectors, $\overline{M}$ is a converted value of a quantity of second frequency-domain basis vectors, $K_0$ is a quantity of first space-frequency combination coefficients, $\overline{K_0}$ is a converted value of a quantity of second space-frequency combination coefficients, R is a candidate value of a rank indicator value corresponding to the second parameter, and R>2.

Further, optionally, that the first parameter is used to determine a second parameter may further include: using the converted value of the second parameter as the second parameter.

Optionally, that the first parameter is used to determine a second parameter may further include: using a sum of an offset value of the second parameter and the converted value of the second parameter as the second parameter.

Optionally, the sending module 501 is further configured to send a second index or the offset value of the second parameter to the terminal device, where one second index corresponds to one offset value of the second parameter.

Optionally, the receiving module 502 is further configured to receive a second index or the offset value of the second parameter from the terminal device, where one second index corresponds to one offset value of the second parameter.

It should be noted that the first parameter corresponds to a first rank indicator value, the second parameter corresponds to a second rank indicator value, and the second rank indicator value is greater than the first rank indicator value.

Optionally, the receiving module 502 is further configured to receive the second rank indicator value from the terminal device.

Optionally, as shown in FIG. 5, the communications apparatus 500 may further include a processing module 503. The processing module 503 is configured to: control the sending module 501 and the receiving module 502 of the communications apparatus 500 to perform functions, and perform an internal processing procedure, for example, determine the first index based on the first parameter and the second parameter, and generate a second precoding matrix based on indication information of the second precoding matrix.

In addition, the communications apparatus 500 may further include a storage module (not shown in FIG. 5). The storage module is configured to store a control program or instructions of the communications apparatus 500. The control program or the instructions may be read and executed by the processor 503, so that the communications apparatus 500 performs functions performed by the network device in the communications method shown in FIG. 3.

An embodiment provides a communications system. The communications system includes one or more terminal devices and one or more network devices.

An embodiment provides a computer program product. The computer program product includes computer program code. When the computer program code is run on a computer, the computer is enabled to perform a function of the terminal device or the network device in the communication method according to the foregoing method embodiment.

An embodiment provides a readable storage medium. The readable storage medium stores a program or instructions. When the program or the instructions are run on a computer, the computer is enabled to perform a function of the terminal device or the network device in the communication method according to the foregoing method embodiment.

It should be noted that the communications apparatus 500 may be a network device, or may be a chip or chip system disposed in the network device. This is not limited in the embodiments.

It should be understood that, the processor in the embodiments may be a central processing unit (CPU), or may further be another general purpose processor, a digital signal processor (DSP), an application-specific integrated circuit (ASIC), a field programmable gate array (FPGA), or another programmable logic device, a discrete gate or a transistor logic device, a discrete hardware component, or the like. The general purpose processor may be a microprocessor, or the processor may be any conventional processor or the like.

It may be understood that the memory in the embodiments may be a volatile memory or a nonvolatile memory, or may include a volatile memory and a nonvolatile memory. The nonvolatile memory may be a read-only memory (read-only memory, ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. Through example but not limitative description, many forms of random access memories RAM may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM).

All or some of the foregoing embodiments may be implemented by using software, hardware (for example, a circuit), firmware, or any combination thereof. When software is used to implement the embodiments, all or some of the foregoing embodiments may be implemented in a form of a computer program product. The computer program product includes one or more computer instructions or computer programs. When the program instructions or the computer programs are loaded and executed on a computer, all or some of the procedures or functions according to the embodiments are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), or a semiconductor medium. The semiconductor medium may be a solid-state drive.

It should be understood that the term "and/or" in the embodiments only used to describe an association relationship for describing associated objects and represents that three relationships may exist. For example, A and/or B may represent the following three cases: only A exists, both A and B exist, and only B exists, where A and B may be singular or plural. In addition, the character "/" generally indicates that the associated objects before and after the character are in an "or" relationship, but may alternatively indicate an "and/or" relationship. For details, refer to the context for understanding.

In the embodiments, "at least one" means one or more, and "a plurality of" means two or more. "At least one of the following (items)" or a similar expression thereof refers to any combination of these items, including any combination of single items or plural items. For example, at least one (item) of a, b, or c may represent a, b, c, a-b, a-c, b-c, or a-b-c, where a, b, and c each may be singular or plural.

In the embodiments, "first", "second", and the like are used to distinguish between different objects, or are used to distinguish between different processing on a same object, but are not used to describe a specific order of objects.

The terms "including", "having", or any other variant thereof in the embodiments are intended to cover a nonexclusive inclusion. For example, a process, a method, a system, a product, or a device that includes a series of steps or units is not limited to the listed steps or units, but some embodiments further include other unlisted steps or units, or some other embodiments further include another inherent step or unit of the process, the method, the product, or the device.

In the embodiments, the term such as "example" or "for example" is used to represent giving an example, an illustration, or a description. Any embodiment or design scheme described as "example" or "for example" in the embodiments should not be explained as being more preferred or having more advantages than another embodiment or design scheme. Exactly, use of the word such as "example" or "for example" is intended to present a relative concept in a specific manner.

In the embodiments, information, signal, message, channel, signaling, and message) may be interchangeably used sometimes. It should be noted that meanings expressed by the terms are consistent when differences are not emphasized. "Of", "corresponding (relevant)" and "corresponding" may sometimes be used together, and it should be noted that these expressions are intended to have a same meaning when differences are not emphasized.

In the embodiments, sometimes a subscript such as $W_1$ may be typographically mistaken for a non-subscript form W1, and a subscript form and a non-subscript form are intended to have a same meaning when differences are not emphasized.

It should be understood that sequence numbers of the foregoing processes do not mean execution sequences in various embodiments. The execution sequences of the processes should be determined according to functions and internal logic of the processes and should not be construed as any limitation on the implementation processes of the embodiments.

A person of ordinary skill in the art may be aware that, in combination with the examples described in the embodiments, units and algorithm steps may be implemented by electronic hardware or a combination of computer software and electronic hardware. Whether the functions are performed by hardware or software depends on particular applications and design constraint conditions of the technical solutions. A person of ordinary skill in the art may use different methods to implement the described functions for each particular application, but it should not be considered that the implementation goes beyond the scope of the embodiments.

It may be clearly understood by a person of ordinary skill in the art that, for the purpose of convenient and brief description, for a detailed working process of the foregoing system, apparatus, and unit, refer to a corresponding process in the foregoing method embodiments, and details are not described herein again.

In the several embodiments provided in the embodiments, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions essentially, or the part contributing to the conventional technology, or some of the solutions may be implemented in a form of a software product. The computer software product is stored in a storage medium and includes several instructions for instructing a computer device (which may be a personal computer, a server, or a network device) to perform all or some of the steps of the methods described in the embodiments. The foregoing storage medium includes: any medium that can store program code, such as a USB flash drive, a removable hard disk, a ROM, a RAM, a magnetic disk, or an optical disc.

The foregoing descriptions are merely specific implementations, but are not intended to limit the scope of the embodiments, which include still other embodiments, not described, made by a person of ordinary skill in the art.

What is claimed is:

1. A communication method, applied to a terminal device, the communication method comprising:
   receiving, by the terminal device, a first parameter from a network device, wherein the first parameter is used to determine indication information of a first precoding matrix, and wherein the first parameter is further used to determine a second parameter, wherein the second parameter is used to determine indication information of a second precoding matrix different from the first precoding matrix; and
   sending, by the terminal device, the indication information of the second precoding matrix to the network device.

2. The communication method according to claim 1, wherein the first parameter comprises one or more of: a quantity of first frequency domain units, a quantity of first spatial-domain basis vectors, a quantity or a ratio of first frequency-domain basis vectors, and a quantity or a ratio of first space-frequency combination coefficients; and
   the second parameter comprises one or more of: a quantity of second frequency domain units, a quantity of second spatial-domain basis vectors, a quantity or a ratio of second frequency-domain basis vectors, and a quantity or a ratio of second space-frequency combination coefficients.

3. The communication method according to claim 2, wherein the first parameter being used to determine the second parameter comprises:
   determining the second parameter based on a first correspondence, wherein the first correspondence comprises one or more of the following correspondences:
   a correspondence between the quantity of first spatial-domain basis vectors and the quantity of second spatial-domain basis vectors;

a correspondence between the quantity of first frequency-domain basis vectors and the quantity of second frequency-domain basis vectors;
a correspondence between the ratio of first frequency-domain basis vectors and the ratio of second frequency-domain basis vectors;
a correspondence between the quantity of first frequency domain units and the ratio of first frequency-domain basis vectors, and the quantity of second frequency-domain basis vectors;
a correspondence between the quantity of first space-frequency combination coefficients and the quantity of second space-frequency combination coefficients;
a correspondence between the ratio of first space-frequency combination coefficients and the ratio of second space-frequency combination coefficients; and
a correspondence between the quantity of first spatial-domain basis vectors, the quantity of first frequency-domain basis vectors, and the ratio of first space-frequency combination coefficients, and the quantity of second space-frequency combination coefficients.

4. The communication method according to claim 1, wherein the first parameter corresponds to a first rank indicator value, the second parameter corresponds to a second rank indicator value, and the second rank indicator value is greater than the first rank indicator value.

5. The communication method according to claim 4, further further comprising:
sending, by the terminal device, the second rank indicator value to the network device.

6. A communication method, applied to a network device, the communication method comprising:
sending, by the network device, a first parameter to a terminal device, wherein the first parameter is used by the terminal device to determine indication information of a first precoding matrix, and wherein the first parameter is further used to determine a second parameter, wherein the second parameter is used to determine indication information of a second precoding matrix different from the first precoding matrix; and
receiving, by the network device, the indication information of the second precoding matrix from the terminal device.

7. The communication method according to claim 6, wherein the first parameter comprises one or more of: a quantity of first frequency domain units, a quantity of first spatial-domain basis vectors, a quantity or a ratio of first frequency-domain basis vectors, and a quantity or a ratio of first space-frequency combination coefficients; and
the second parameter comprises one or more of: a quantity of second frequency domain units, a quantity of second spatial-domain basis vectors, a quantity or a ratio of second frequency-domain basis vectors, and a quantity or a ratio of second space-frequency combination coefficients.

8. The communication method according to claim 7, wherein the first parameter being used to determine the second parameter comprises:
determining the second parameter based on a first correspondence, wherein the first correspondence comprises one or more of the following correspondences:
a correspondence between the quantity of first spatial-domain basis vectors and the quantity of second spatial-domain basis vectors;
a correspondence between the quantity of first frequency-domain basis vectors and the quantity of second frequency-domain basis vectors;
a correspondence between the ratio of first frequency-domain basis vectors and the ratio of second frequency-domain basis vectors;
a correspondence between the quantity of first frequency domain units and the ratio of first frequency-domain basis vectors, and the quantity of second frequency-domain basis vectors;
a correspondence between the quantity of first space-frequency combination coefficients and the quantity of second space-frequency combination coefficients;
a correspondence between the ratio of first space-frequency combination coefficients and the ratio of second space-frequency combination coefficients; and
a correspondence between the quantity of first spatial-domain basis vectors, the quantity of first frequency-domain basis vectors, and the ratio of first space-frequency combination coefficients, and the quantity of second space-frequency combination coefficients.

9. The communication method according to claim 6, wherein the first parameter corresponds to a first rank indicator value, the second parameter corresponds to a second rank indicator value, and the second rank indicator value is greater than the first rank indicator value.

10. The communication method according to claim 9, further comprising:
receiving, by the network device, the second rank indicator value from the terminal device.

11. A communications apparatus, applied to a terminal device, the communications apparatus comprising a receiver and a transmitter, wherein
the receiver is configured to receive a first parameter from a network device, wherein the first parameter is used to determine indication information of a first precoding matrix, and wherein the first parameter is further used to determine a second parameter, wherein the second parameter is used to determine indication information of a second precoding matrix different from the first precoding matrix; and
the transmitter is configured to send the indication information of the second precoding matrix to the network device.

12. The communications apparatus according to claim 11, wherein the first parameter comprises one or more of: a quantity of first frequency domain units, a quantity of first spatial-domain basis vectors, a quantity or a ratio of first frequency-domain basis vectors, and a quantity or a ratio of first space-frequency combination coefficients; and
the second parameter comprises one or more of: a quantity of second frequency domain units, a quantity of second spatial-domain basis vectors, a quantity or a ratio of second frequency-domain basis vectors, and a quantity or a ratio of second space-frequency combination coefficients.

13. The communications apparatus according to claim 12, wherein the first parameter being used to determine the second parameter comprises:
a determination of the second parameter based on a first correspondence, wherein the first correspondence comprises one or more of the following correspondences:
a correspondence between the quantity of first spatial-domain basis vectors and the quantity of second spatial-domain basis vectors;
a correspondence between the quantity of first frequency-domain basis vectors and the quantity of second frequency-domain basis vectors;

a correspondence between the ratio of first frequency-domain basis vectors and the ratio of second frequency-domain basis vectors;

a correspondence between the quantity of first frequency domain units and the ratio of first frequency-domain basis vectors, and the quantity of second frequency-domain basis vectors;

a correspondence between the quantity of first space-frequency combination coefficients and the quantity of second space-frequency combination coefficients;

a correspondence between the ratio of first space-frequency combination coefficients and the ratio of second space-frequency combination coefficients; and a correspondence between the quantity of first spatial-domain basis vectors, the quantity of first frequency-domain basis vectors, and the ratio of first space-frequency combination coefficients, and the quantity of second space-frequency combination coefficients.

14. The communications apparatus according to claim 11, wherein the first parameter corresponds to a first rank indicator value, the second parameter corresponds to a second rank indicator value, and the second rank indicator value is greater than the first rank indicator value.

15. The communications apparatus according to claim 14, wherein
the transmitter is further configured to send the second rank indicator value to the network device.

16. A communications apparatus, applied to a network device, the communications apparatus comprising a transmitter and a receiver, wherein
the transmitter is configured to send a first parameter to a terminal device, wherein the first parameter is used by the terminal device to determine indication information of a first precoding matrix, and wherein the first parameter is further used to determine a second parameter, wherein the second parameter is used to determine indication information of a second precoding matrix different from the first precoding matrix; and
the receiver is configured to receive the indication information of the second precoding matrix from the terminal device.

17. The communications apparatus according to claim 16, wherein the first parameter comprises one or more of: a quantity of first frequency domain units, a quantity of first spatial-domain basis vectors, a quantity or a ratio of first frequency-domain basis vectors, and a quantity or a ratio of first space-frequency combination coefficients; and
the second parameter comprises one or more of: a quantity of second frequency domain units, a quantity of second spatial-domain basis vectors, a quantity or a ratio of second frequency-domain basis vectors, and a quantity or a ratio of second space-frequency combination coefficients.

18. The communications apparatus according to claim 17, wherein the first parameter being used to determine the second parameter comprises:
a determination of the second parameter based on a first correspondence, wherein the first correspondence comprises one or more of the following correspondences:

a correspondence between the quantity of first spatial-domain basis vectors and the quantity of second spatial-domain basis vectors;

a correspondence between the quantity of first frequency-domain basis vectors and the quantity of second frequency-domain basis vectors;

a correspondence between the ratio of first frequency-domain basis vectors and the ratio of second frequency-domain basis vectors;

a correspondence between the quantity of first frequency domain units and the ratio of first frequency-domain basis vectors, and the quantity of second frequency-domain basis vectors;

a correspondence between the quantity of first space-frequency combination coefficients and the quantity of second space-frequency combination coefficients;

a correspondence between the ratio of first space-frequency combination coefficients and the ratio of second space-frequency combination coefficients; and a correspondence between the quantity of first spatial-domain basis vectors, the quantity of first frequency-domain basis vectors, and the ratio of first space-frequency combination coefficients, and the quantity of second space-frequency combination coefficients.

19. The communications apparatus according to claim 16, wherein the first parameter corresponds to a first rank indicator value, the second parameter corresponds to a second rank indicator value, and the second rank indicator value is greater than the first rank indicator value.

20. The communications apparatus according to claim 19, wherein
the receiver is further configured to receive the second rank indicator value from the terminal device.

21. A communications device, comprising: a processor, the processor being coupled to a memory, wherein
the memory is configured to store a computer program; and
the processor is configured to execute the computer program stored in the memory, so that the communications device performs the communication method according to claim 1.

22. A communications device, comprising: a processor, the processor being coupled to a memory, wherein
the memory is configured to store a computer program; and
the processor is configured to execute the computer program stored in the memory, so that the communications device performs the communication method according to claim 6.

23. A non-transitory computer-readable storage medium, storing a program or instructions, wherein when the program or the instructions are run on a computer, the computer is enabled to perform the communication method according to claim 1.

24. A non-transitory computer-readable storage medium, storing a program or instructions, wherein when the program or the instructions are run on a computer, the computer is enabled to perform the communication method according to claim 6.

* * * * *

UNITED STATES PATENT AND TRADEMARK OFFICE
CERTIFICATE OF CORRECTION

PATENT NO. : 11,929,799 B2
APPLICATION NO. : 17/488588
DATED : March 12, 2024
INVENTOR(S) : Xiang Gao et al.

Page 1 of 1

It is certified that error appears in the above-identified patent and that said Letters Patent is hereby corrected as shown below:

In the Claims

Column 55, Lines 27-28, should read as "The communication method according to claim 4, further comprising:".

Signed and Sealed this
Fourth Day of June, 2024

Katherine Kelly Vidal
*Director of the United States Patent and Trademark Office*